US008454183B2

(12) United States Patent
Hisada

(10) Patent No.: US 8,454,183 B2
(45) Date of Patent: Jun. 4, 2013

(54) LIGHT SOURCE HOLDER, LIGHTING DEVICE, DISPLAY DEVICE AND TELEVISION RECEIVER

(75) Inventor: Yasunari Hisada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 367 days.

(21) Appl. No.: 12/992,930

(22) PCT Filed: Feb. 17, 2009

(86) PCT No.: PCT/JP2009/052667
§ 371 (c)(1),
(2), (4) Date: Nov. 16, 2010

(87) PCT Pub. No.: WO2009/154018
PCT Pub. Date: Dec. 23, 2009

(65) Prior Publication Data
US 2011/0102686 A1 May 5, 2011

(30) Foreign Application Priority Data

Jun. 17, 2008 (JP) ................................ 2008-158437

(51) Int. Cl.
G09F 13/04 (2006.01)
G09F 13/08 (2006.01)
(52) U.S. Cl.
USPC .......................... 362/97.2; 362/97.1; 362/614
(58) Field of Classification Search
USPC ........................................ 362/97.1, 97.2, 614
See application file for complete search history.

(56) References Cited

U.S. PATENT DOCUMENTS

| 6,590,626 | B1 * | 7/2003 | Suzuki et al. | 349/70 |
|---|---|---|---|---|
| 2004/0263714 | A1 * | 12/2004 | Huang et al. | 349/58 |
| 2005/0083675 | A1 * | 4/2005 | Huang et al. | 362/31 |
| 2009/0201666 | A1 * | 8/2009 | Takata et al. | 362/97.1 |
| 2009/0256789 | A1 * | 10/2009 | Takata | 345/87 |
| 2009/0310061 | A1 * | 12/2009 | Takata | 349/58 |

FOREIGN PATENT DOCUMENTS

JP 2005-251479 A 9/2005
JP 2007-128712 A 5/2007

OTHER PUBLICATIONS

Official Communication issued in International Patent Application No. PCT/JP2009/052667, mailed on Mar. 17, 2009.

* cited by examiner

Primary Examiner — Evan Dzierzynski
Assistant Examiner — Danielle Allen
(74) Attorney, Agent, or Firm — Keating & Bennett, LLP

(57) ABSTRACT

A lamp clip 20 holds at least one of a plurality of cold cathode tubes 18 that are arranged parallel to each other. The lamp clip 20 includes a pair of arms 30, 31 configured so as to extend along a parallel arrangement direction of the cold cathode tubes 18. The parallel arrangement direction extends from one cold cathode tube 18 to another. The arms 30, 31 have distal ends separated from each other to from an opening 33. The opening 33 allows insertion and removal of the cold cathode tube 18 therethrough, and the arms 30, 31 hold the cold cathode tube 18 therebetween. A plurality of light source receiving surfaces 32 that receive the cold cathode tube 18 are provided so as to be along the parallel arrangement direction on at least one of surfaces of the arms 30, 31 facing the cold cathode tube 18.

17 Claims, 25 Drawing Sheets

FIG.1
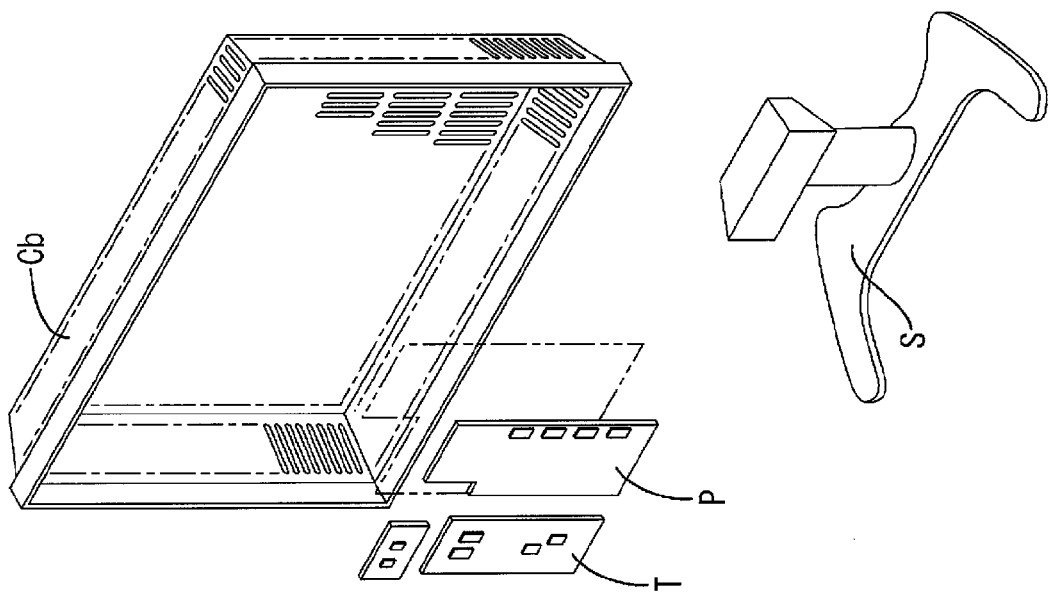
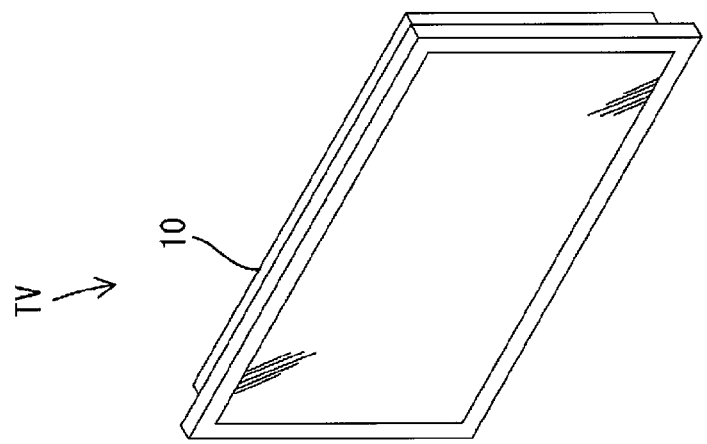
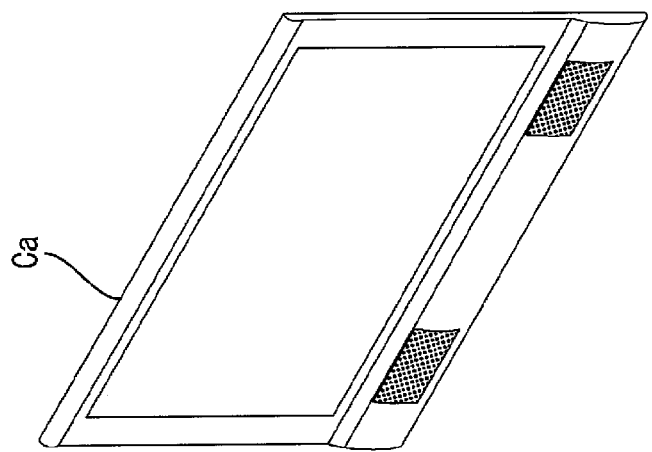

LIGHT SOURCE HOLDER, LIGHTING DEVICE, DISPLAY DEVICE AND TELEVISION RECEIVER

TECHNICAL FIELD

The present invention relates to a light source holder, a lighting device, a display device and a television receiver.

BACKGROUND ART

A liquid crystal panel included in a liquid crystal display device does not emit light, and thus a backlight device is required as a separate lighting device. The backlight device is arranged behind the liquid crystal panel (i.e., on a side opposite from a display surface side). It includes a chassis having an opening on a liquid crystal panel side, a reflecting sheet that is disposed in the chassis, a plurality of cold cathode tubes arranged in the chassis so as to be parallel to each other, an optical member (diffuser plate and the like) provided at the opening of the chassis for efficiently directing light emitted from the cold cathode tubes to a liquid crystal panel, and a lamp clip for supporting a middle portion of the elongated tubular cold cathode tube.

An example of the lamp clip that is disclosed in Patent Document 1 is known. The lamp clip includes a main body that is attached to the chassis and a plurality of lamp holding parts that hold each cold cathode tube. The lamp holding parts are provided on the main body. The lamp holding part is formed in a circle a part of which opens frontward, that is, opens in the same direction as the opening of the chassis.

[Patent Document 1] Japanese Unexamined Patent Publication No. 2007-128712

PROBLEM TO BE SOLVED BY THE INVENTION

In the above configuration, an arrangement position of each lamp holding part is fixed in the lamp clip. An interval between the lamp holding parts is same as an interval between the cold cathode tubes that are arranged in the chassis in parallel with each other. Thus, the lamp clip is exclusive for the one corresponding to the arrangement pattern of the cold cathode tubes.

The arrangement pattern of the cold cathode tubes may be changed due to various reasons as described below. For example, if the number of cold cathode tubes used for the backlight device varies depending on the screen size of the liquid crystal panel, the interval between the cold cathode tubes may be changed accordingly. Even if the screen size is same, the required specification (spec) such as brightness varies depending on the model type (grade) of the product. Accordingly, the number of the cold cathode tubes and the interval between the cold cathode tubes may be changed. The arrangement pattern of the cold cathode tubes includes a regular intervals arrangement and an irregular intervals arrangement. In the regular intervals arrangement, the cold cathode tubes are arranged at regular intervals. In the irregular intervals arrangement, the cold cathode tubes are arranged so that the cold cathode tubes in a middle portion of the screen are arranged at small intervals and the cold cathode tubes in two ends of the screen are arranged at large intervals.

As described above, although the arrangement pattern of the cold cathode tubes may be varied, the lamp clip is exclusive for each arrangement pattern. Therefore, various lamp clips are required to be manufactured corresponding to each arrangement pattern. Especially, in the irregular intervals arrangement of the cold cathode tubes, a plurality of kinds of lamp clips are required to be manufactured for one backlight device. This excessively increases the number of types of the lamp clips and also increases a cost.

The present invention was made in view of the foregoing circumstances. An object of the present invention is to decrease the number of types of light source holders.

MEANS FOR SOLVING THE PROBLEM

A light source holder according to the present invention holds at least one of a plurality of linear light sources that are arranged parallel to each other. The light source holder includes a pair of arms configured so as to extend along a parallel arrangement direction of the linear light sources, the parallel arrangement direction extending from one linear light source to another, such that their distal ends are separated from each other to form an opening. The opening allows insertion and removal of the linear light source therethrough. The arms hold the linear light source therebetween. The light source holder further includes a plurality of light source receivers provided so as to be along the parallel arrangement direction on at least one of surfaces of the arms. The surface is to be opposite the linear light source, and each of the light source receiver is configured to receive the linear light source.

Accordingly, the linear light source is inserted through the opening between the distal ends of the arms to be held between the arms. At this time, the linear light source is received selectively by one of a plurality of light source receivers aligned on the surface of the arm facing the linear light source. Therefore, the linear light source is selectively positioned in the light source holder more freely in the parallel arrangement direction of the linear light sources. Accordingly, the light source holder deals with various arrangement patterns of linear light sources.

BRIEF DESCRIPTION OF THE DRAWINGS

FIG. 1 is an exploded perspective view illustrating a general construction of a television receiver according to a first embodiment of the present invention;

BEST MODE FOR CARRYING OUT THE INVENTION

First Embodiment

The first embodiment of the present invention will be explained with reference to FIGS. 1 to 13. In this embodiment, a construction of a liquid crystal display device 10 provided with a liquid crystal panel 11 will be explained. In the following, the up-and-down direction is represented with reference to FIGS. 2 and 3, and the upper side in FIGS. 2 and 3 refers to as a front side and the lower side in FIGS. 2 and 3 refers to as a rear side. An X-axis, a Y-axis and a Z-axis are illustrated in some drawings and each axial direction represents a direction illustrated in each drawing.

Figure 2:
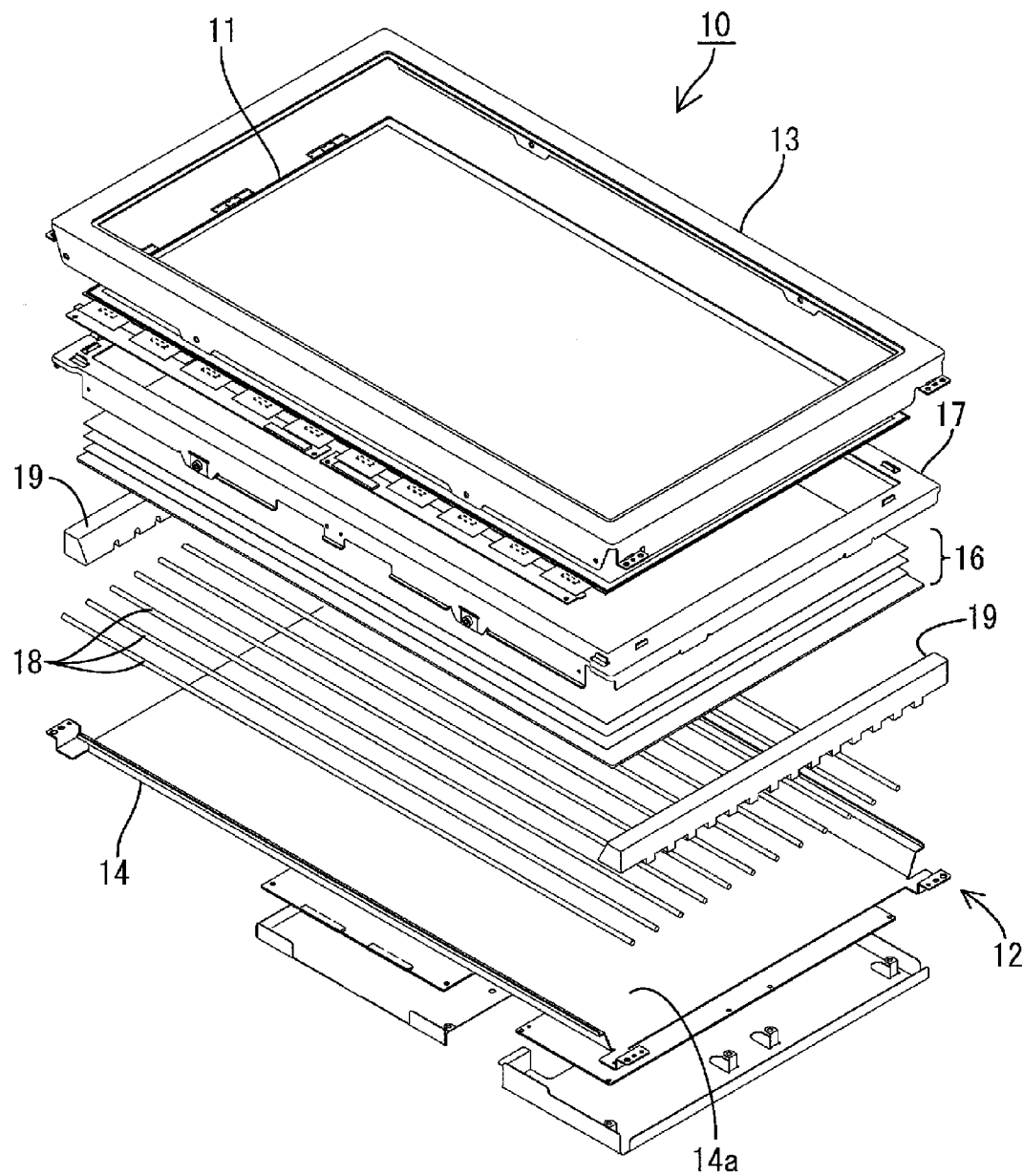
FIG. 2 is an exploded perspective view illustrating a general construction of a liquid crystal display device.

An overall shape of the liquid crystal display device 10 is a landscape rectangular. As illustrated in FIG. 2, it includes a liquid crystal panel 11 as a display panel that displays images, and a backlight device 12, which is an external light source (lighting device) that irradiates light toward the liquid crystal panel 11. The backlight device 12 is arranged on a rear side (back side) of the liquid crystal panel 11 and they are integrally held by a bezel 13 and the like. The liquid crystal display device 10 is applicable to the television receiver TV. As illustrated in FIG. 1, the television receiver TV includes the liquid crystal display device 10, front and rear cabinets Ca, Cb that house the liquid crystal display device 10 therebetween, a power source P, a tuner T that receives television broadcasts and a stand S.

The liquid crystal panel 11 includes a pair of transparent (translucent) glass substrate that is formed in a rectangular shape and a crystal liquid layer (not shown) containing liquid crystal molecules that change their optical characteristics by the application of an electric field. The liquid crystal panel 11 is constructed such that the transparent glass substrates are bonded together by a sealing agent with a predetermined gap corresponding to the thickness of the liquid crystal layer therebetween.

One of the substrates facing the front side is a CF substrate and the another one of the substrates facing the rear side (back side) is an array substrate. On an inner surface of the array substrate (a surface close to the liquid crystal layer, a surface facing the CF substrate), TFTs (Thin Film Transistors) that are switching components and pixel electrodes are provided. In surrounding portions of the TFTs and the pixel electrodes, gate lines and source lines formed in a grid are provided so as to surround the TFTs and the pixel electrodes. The pixel electrodes comprise transparent electrodes such as ITO (Indium Tin Oxide) or ZnO (Zinc Oxide).

On the CF substrate, a plurality of color filters are provided to correspond to respective pixels. The color filter has three color sections including R (red), G (green) and B (blue) that are arranged alternately. A light shielding layer (black matrix) is provided at the boundaries between the color filters to prevent color mixture. Counter electrodes facing the pixel electrodes on the array substrate are provided on the surface of the color filter and the shielding layer. A directing layer is provided on an inner surface of each of the substrates. The directing layer directs the liquid crystal molecules contained in the liquid crystal layer. A polarizing plate is attached to an outer surface of each substrate.

Figure 3:
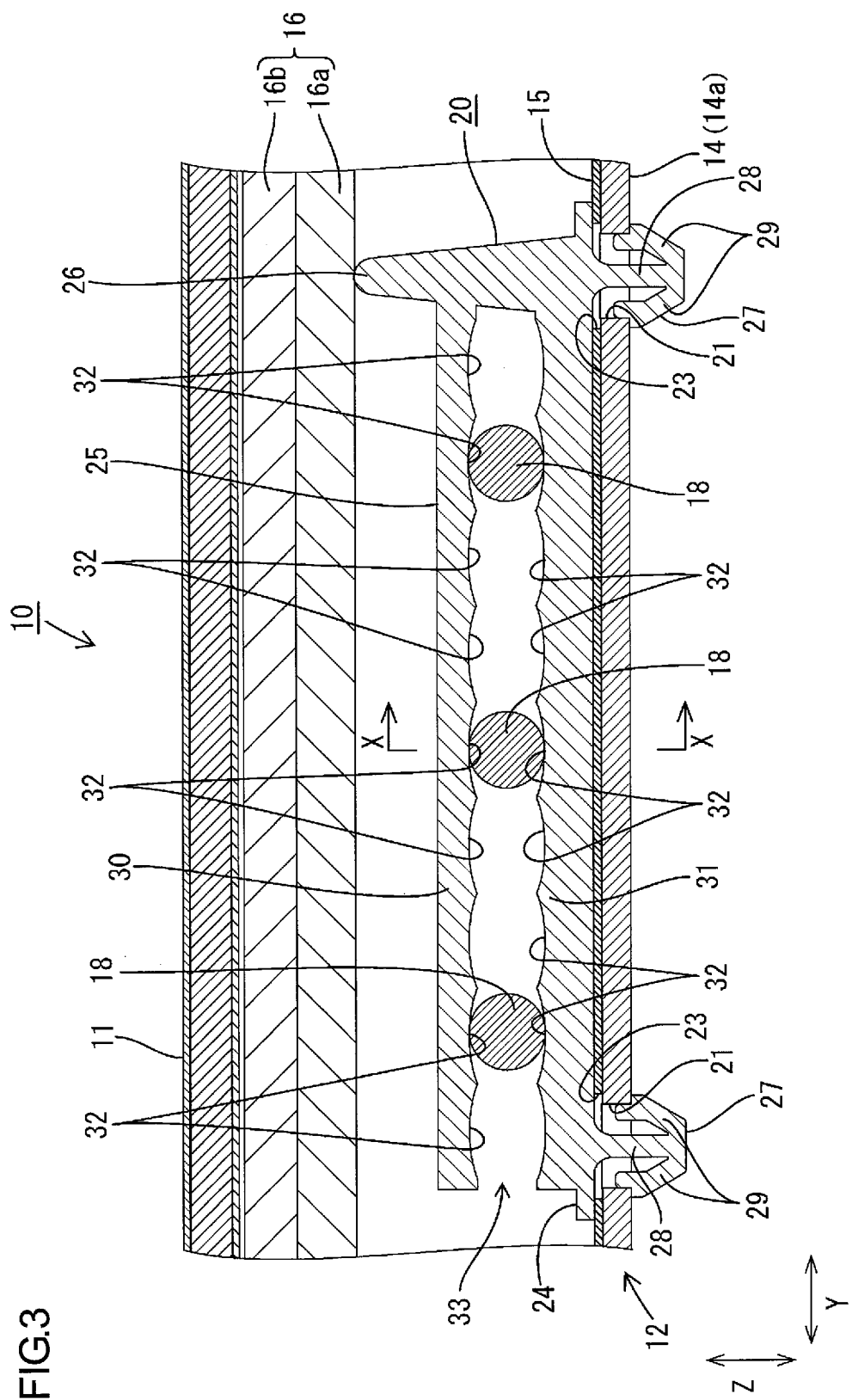
FIG. 3 is a cross-sectional view illustrating a lamp clip provided in the liquid crystal display device.

The backlight device 12 is a so-called direct-light type backlight, which includes light sources to be arranged directly below the back surface of the liquid crystal panel 11, as illustrated in FIGS. 2 and 3. The backlight device 12 includes a chassis 14 having an opening on its front side (light output side) and formed in a substantially box, a reflective sheet 15 provided in the chassis 14, an optical member 16 arranged at the opening of the chassis 14, a frame 17 arranged to fix the optical member 16, and a plurality of (twelve in FIG. 4) cold cathode tubes 18 arranged in parallel with each other in the chassis 14. Further included are a pair of holders 19, which hold the end portions of the cold cathode tubes 18 and a plurality of lamp clips 20 that hold middle portions of the cold cathode tubes 18. A light outputting direction in the backlight device 12 is the Z-axial direction in the drawing.

The chassis 14 is made of metal and it includes a rectangular bottom plate 14a like the liquid crystal panel 11 and side rims, each of which extends upright from the corresponding peripheral edge of the bottom plate 14a. As illustrated in FIG. 3, the bottom plate 14a has a surface to which the lamp clips 20 are attached. A plurality of attachment openings 21 to which the lamp clips 20 are attached are formed in the surface. Each attachment opening 21 is formed to be a circular opening with a planar view. A pair of attachment openings 21 is prepared for one lamp clip 20 and the attachment openings 21 are formed so as to correspond to the positions where each lamp clip 20 is supposed to be attached.

The reflective sheet 15 is a synthetic resin sheet having a surface in white color that provides high light reflectivity. It is placed so as to cover almost entire inner surface of the chassis 14. The reflective sheet 15 directs most of the light emitted from each cold cathode tube 18 to the opening side of the chassis 14. A plurality of insertion openings 23 are formed in the reflective sheet 15 so that each attachment portion 27 of the lamp clip 20 is inserted therein. The attachment portion 27 is an attachment mechanism to the chassis 14. Each insertion opening 23 is formed so as to correspond to each attachment opening 21 formed in the chassis 14. Specifically, each insertion opening 23 and each attachment opening 21 are overlapped with each other with a planer view, when the reflective sheet 15 is provided in the chassis 14. Each insertion opening 23 is formed to be circular with a planer view, and its diameter is slightly greater than the diameter of each attachment opening 21.

Figure 4:
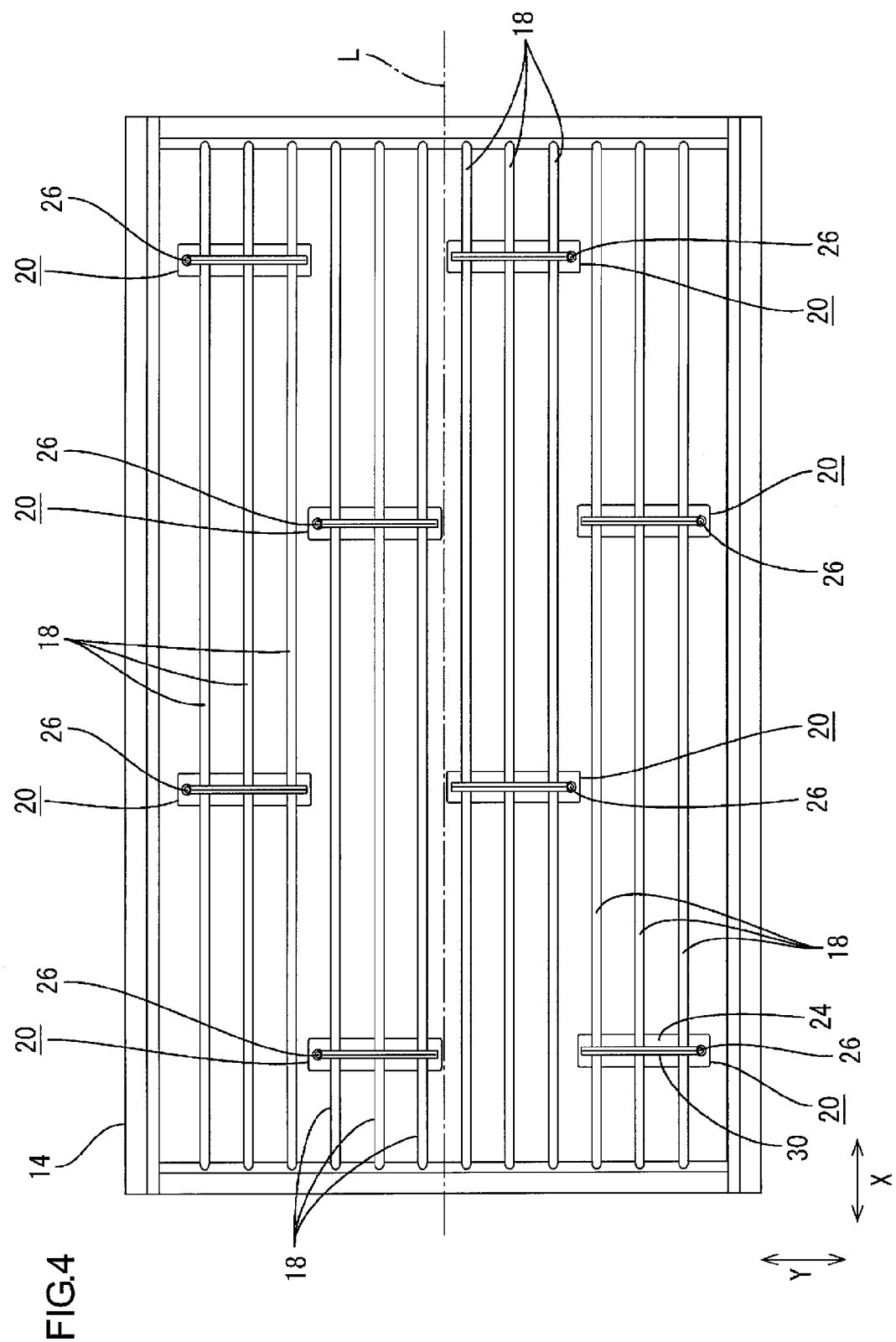
FIG. 4 is a plan view illustrating a chassis to which lamp clips are attached.

The cold cathode tube 18 is a kind of a linear light source (tubular light source). As illustrated in FIG. 4, a plurality of the cold cathode tubes 18 are arranged in the chassis 14 such that their axial direction aligns with the long-side direction (X-axis direction) of the chassis 14. The axes of the cold cathode tubes 18 are arranged substantially in parallel with each other with having a predetermined distance therebetween. Therefore, a parallel arrangement direction extending from one cold cathode tube 18 to another and in which the cold cathode tubes 18 are arranged aligns with a short-side direction (Y-axis direction) of the chassis 14. The axial direction (X-axis direction) of each cold cathode tube 18 and the parallel arrangement direction (Y-axis direction) of the cold cathode tubes 18 are substantially parallel to a plate surface of the bottom plate 14a (the optical member 16 and the liquid crystal panel 11) of the chassis 14. The cold cathode tube 18 is formed in an elongated cylindrical glass tube whose two ends are closed. The cold cathode tube 18 is generally configured such that mercury is sealed in the glass tube and an inner wall of the glass tube is coated with a fluorescent material and electrodes are enclosed at the two ends of the glass tube. Each cold cathode tube 18 has a tubular diameter of approximately several millimeters and has a tubular length of approximately tens of centimeters to 1.5 meters. Therefore, a whole cold cathode tube 18 is quite thin and long and the glass tube is elastically deformable. A cross-section of the cold cathode tube 18 in the parallel arrangement direction is circular at its outer peripheral surface.

The holder 19 is made of white synthetic resin having high light reflectivity and it covers the ends (that do not emit light) of the cold cathode tube 18 where the electrodes are provided. The holder 19 is formed in an elongated substantially box shape that extends along the short side of the chassis 14.

As illustrated in FIGS. 2 and 3, the short-side edges of the optical member 16 are sandwiched between the holders 19 and a frame 17 and the long-side edges of the optical member 16 are sandwiched between the chassis 14 and the frame 17 so that the optical member 16 is fixed. The optical member 16 includes a diffuser plate 16a that is provided to cover the opening of the chassis 14 and a plurality of optical sheets 16b that are provided between the diffuser plate 16a and the liquid crystal panel 11. The diffuser plate 16a includes a synthetic resin plate containing scattered light diffusing particles. It diffuses linear light emitted from the cold cathode tubes 18 that are linear light sources (tubular light sources) and has a light diffusing function for diffusing light emitted from the cold cathode tubes 18. The optical sheets 16b provided on the diffuser plate 16a includes a diffuser sheet, a lens sheet and a reflecting type polarizing plate layered in this order from the diffuser plate 16a side. The optical sheets 16b convert light emitted from the cold cathode tubes 18 and passing through the diffuser plate 16a to planer light.

The lamp clip 20 will be explained. The lamp clip 20 is made of a white synthetic resin (for example, polycarbonate) that provides high light reflectivity. The lamp clip 20 has a main body 24 (an attachment plate, a base portion) that is formed in a substantially plate and a substantially rectangle with a planer view so that the plate is parallel to the bottom plate 14a of the chassis 14 (the axial direction and the parallel arrangement direction of the cold cathode tubes 18). The lamp clips 20 are attached to the chassis 14 so that the long-side direction (Y-axis direction) of each main body 24 is substantially parallel to the short-side direction of the chassis 14, that is, so that the long-side direction of the main body 24 is substantially parallel to the parallel arrangement direction of the cold cathode tubes 18 (a direction crossing to the axial direction, X-axis direction) in FIG. 2.

The lamp clips 20 are provided in a plurality of separated positions on the bottom plate 14a of the chassis 14. Specifically, as illustrated in FIG. 4, the lamp clips 20 are arranged in staggered layout (a zigzag pattern). A set of two lamp clips 20 is positioned along the long-side direction of the chassis 14 with a predetermined distance therebetween. Four sets of the lamp clips 20 are arranged along the short-side direction of the chassis 14. The adjacent sets of the two lamp clips 20 are arranged offset from each other in the long-side direction of the chassis 14.

Figure 5:
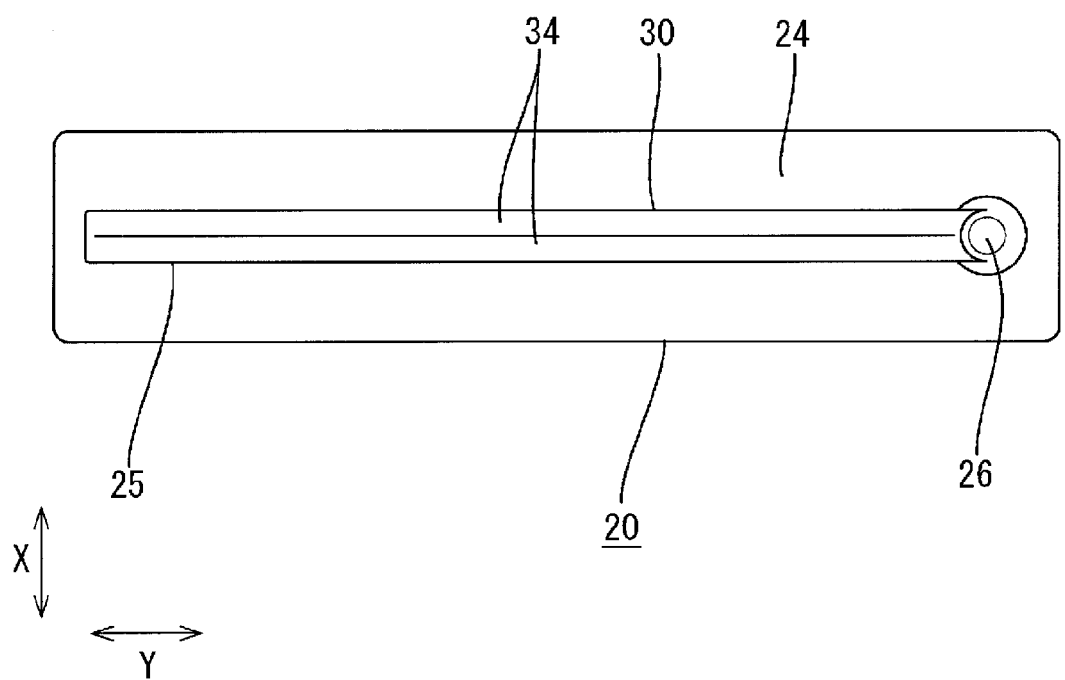
FIG. 5 is a plan view illustrating a lamp clip.

A lamp holding portion 25 and a support pin 26 are provided on a front surface of the main body 24 (a surface facing the optical member 16 or the cold cathode tubes 18, a surface opposite from the chassis 14), as illustrated in FIGS. 3 to 5. The lamp holding portion 25 supports the cold cathode tubes 18 at a predetermined height, and the support pin 26 supports the diffuser plate 16a at a higher position than the cold cathode tubes 18. A pair of attachment portions 27 is provided on a rear surface of the main body 24 (a surface facing the chassis 14 or the reflective sheet 15, a surface opposite from the optical member 16 or the cold cathode tubes 18). The attachment portions 27 hold the lamp clip 20 to be in the state that the lamp clip 20 is attached to the chassis 14.

The support pin 26 and the attachment portions 27 will be specifically explained. Each support pin 26 supports the diffuser plate 16a at its middle portions in the screen that are away from the outer peripheral portions that are supported by the holders 19. The support pin 26 supports the diffuser plate 16a from its rear side. This restricts the diffuser plate 16a from being distorted or deflected down to the cold cathode tubes 18. The support pin 26 is provided at one end (a right end in FIG. 3) of the two ends of the main body 24 in the long-side direction. The support pin 26 has a circular horizontal cross section (FIG. 5) and is formed in a taper shape so that its diameter decreases from its basal portion to its distal end. Namely, the support pin 26 is formed in a substantially conical shape. The support pin 26 has the distal end that contacts the diffuser plate 16a and the distal end is formed to be round. The height of the support pin 26 extending from the main body 24 (a size in the Z-axis direction) is set to be greater than that of the lamp holding portion 25. The support pin 26 extends to the highest position in the lamp clip 20. Therefore, when the lamp clip 20 is attached to or removed from the chassis 14, the user holds the support pin 26 to execute the operation. The support pin 26 functions as an operation portion when the lamp clip 20 is attached to or removed from the chassis 14.

Each of the attachment portions 27 is provided on each of the two ends of the main body 24 in the long-side direction respectively. The attachment portion 27 provided close to one end (the right end in FIG. 3) of the main body 24 is arranged so as to overlap with the support pin 26 with a planer view, which is provided on the front side. Each attachment portion 27 comprises a base portion 28 and a pair of projections 29. The base portion 28 projects from the rear surface of the main body 24. Each projection 29 extends from the distal end of the base portion 28 toward the main body 24 so that side surface of each projection 29 faces the side surface of the base portion 28. The base portion 28 projects substantially vertically from the rear surface of the main body 24 and the projecting direction aligns with a direction crossing to the plate surface of the main body 24. The base portion 28 is formed in a substantially square column having a rectangular cross section, and its long-side direction is aligned with the short-side direction of the main body 24.

Each projection 29 projects from corresponding one of the two long-side surfaces of the distal end of the base portion 28. The projections 29 project in opposite directions from each other in the long-side direction of the main body 24. Therefore, the projections 29 are provided to be aligned with each other in the long-side direction of the main body 24 with sandwiching the base portion 28 therebetween. Each of the projections 29 is formed to be slanted with respect to the base portion 28 so as to be away from the base portion 28 gradually from its basal end toward its free end. Each projection 29 is elastically deformable with its basal end being a support point so that the distal end of the projection 29 is close to or separated from the base portion 28 (in the long-side direction of the main body 24). The distal end of the projection 29 has an inner portion that is relatively close to the base portion 28 and an outer portion having a step lower than the inner portion. After the lamp clip 20 is attached to the chassis 14, the inner portion is in the attachment opening 21 of the chassis 14 and the outer portion is outside the attachment opening 21. The surface of the outer portion facing the main body 24 functions as a stopper surface that abuts an edge of the attachment opening 21 from the rear side. A distance between the main body 24 and the stopper surface is substantially equal to the total of the thickness of the chassis 14 and that of the reflective sheet 15.

The lamp holding portion 25 will be specifically explained. As illustrated in FIG. 3, the lamp holding portion 25 includes a pair of arms 30, 31 that are substantially parallel to the main body 24 and face to each other in the Z-axis direction. The arms 30, 31 hold the cold cathode tubes 18 therebetween. In other words, the arms 30, 31 are provided with having an arrangement space for the cold cathode tubes 18 therebetween so that the arm 30 is provided close to the optical member 16 and the arm 31 is provided close to the chassis 14. Each arm 30, 31 extends in the Y-axis direction, that is the parallel arrangement direction of the cold cathode tubes 18. A plurality of lamp receiving surfaces 32 that receive the cold cathode tubes 18 are formed on inner surfaces of the arms 30, 31, that are facing surfaces facing the cold cathode tubes 18. The lamp receiving surfaces 32 are formed to be aligned along the extending direction (longitudinal direction) of the arms 30, 31, that is the parallel arrangement direction of the cold cathode tubes 18. This enables the cold cathode tubes 18 to be positioned selectively with respect to the lamp holding portion 25. Therefore, such a lamp clip 20 easily deals with the case in that the arrangement pattern of the cold cathode tubes 18 in the backlight device 12 (the number of arranged cold cathode tubes 18 and the arrangement interval between the cold cathode tubes 18) is changed.

Specifically, each arm 30, 31 is formed like a cantilever, and extends in the parallel arrangement direction of the cold cathode tubes 18 (the long-side direction of the main body 24, the short-side direction of the chassis 14, the direction crossing to the axial direction (X-axis direction) of the cold cathode tube 18 and also crossing to the thickness direction (Z-axis direction) of the backlight device 12). Each arm 30, 31 has a basal end that is connected to a side surface of the support pin 26 and a free end (distal end). The distal ends of the arms 30, 31 are separated from each other to form an opening 33 that opens laterally in a direction opposite from the support pin 26. The cold cathode tubes 18 are fitted in a space between the arms 30, 31 through the opening 33. The direction of insertion and removal of the cold cathode tubes 18 with respect to the lamp holding portion 25 is aligned with the extending direction of the arms 30, 31 that is the parallel arrangement direction of the cold cathode tubes 18. The upper arm 30 in FIG. 3 is elastically deformable with its basal end being the support point. The arm 30 is elastically deformable in the Z-axis direction, that is the direction crossing to the insertion and removal direction of the cold cathode tubes 18 and crossing to the axial direction of the cold cathode tubes 18. The elastic deformation of the arm 30 enlarges the opening size of the opening 33 from its original state. This allows the cold cathode tubes 18 passing through the opening 33. In the elastically deformed state, the distance between the arms 30, 31 is greatest at the free ends (the opening 33) and decreases in a gradual manner as it is closer to the basal ends (see the alternate long and two short dashes lines in FIG. 8). In the original state of the arms 30, 31, the arms 30, 31 are substantially parallel to each other with the distance between the arms 30, 31 being substantially constant over its entire length including the opening 33. The distance between the arms 30, 31 at the opening 33 in the original state is smaller than the diameter of the cold cathode tube 18.

As illustrated in FIG. 5, each of the arms 30, 31 is formed in a rectangular shape with a planer view and each of its long-side direction (longitudinal direction) and its short-side direction (width direction) is aligned with the respective corresponding direction of the main body 24. Each arm 30, 31 is provided within a main body 24 area in two dimensions along the plate surface of the main body 24 (the axial direction and the parallel arrangement direction of the cold cathode tubes 18). Each arm 30, 31 does not extend outwardly from an outer peripheral end of the main body 24. The length of each arm 30, 31 is greater than the maximum possible arrangement interval between the cold cathode tubes 18.

Figure 6:
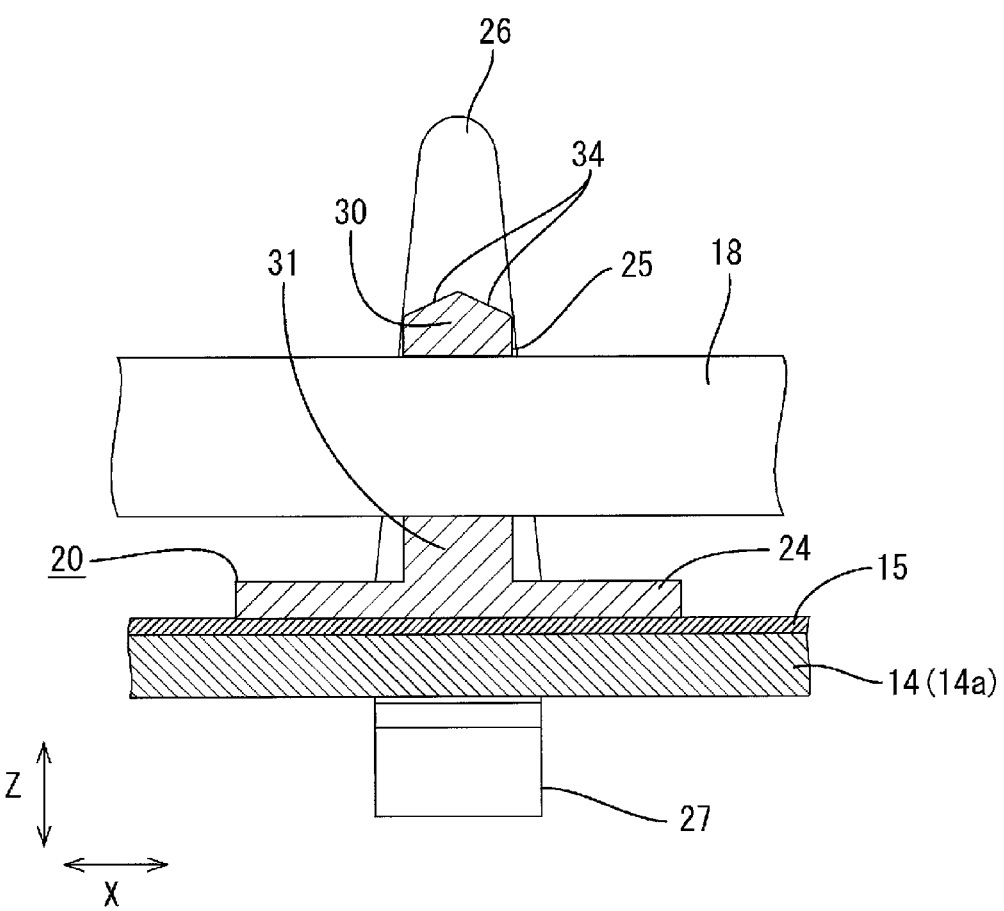
FIG. 6 is a cross-sectional view taken along a X-X line in FIG. 3 illustrating the lamp clip provided in the liquid crystal display device.

As illustrated in FIG. 6, the upper arm 30, which is illustrated in FIG. 3, has a convex surface including a pair of sloped surfaces 34. The convex surface faces the optical member 16 (a surface opposite from the one facing the cold cathode tubes 18). The sloped surfaces 34 are sloped from a middle portion of the arm 30 in its short-side direction (the axial direction of the cold cathode tubes 18) downwardly to the two ends of the arm 30 in its short-side direction. The light emitted from the cold cathode tubes 18 reflects off the sloped surfaces 34 effectively to be directed to the optical member 16.

Among the arms 30, 31, the lower arm 31 in FIG. 3 that is provided close to the chassis 14 is formed to overlap with the main body 24, as illustrated in FIGS. 3 and 6. The arm 31 is formed continuously from the surface of the main body 24 facing the cold cathode tubes 18 over the entire area of the arm 31 including its entire length and width. The arm 31 is relatively high in its rigidity and strength compared to the upper arm 30.

The lamp receiving surfaces 32 will be specifically explained. The lamp receiving surfaces 32 are formed by depressing inner surfaces of the arms 30, 31 so as to be depressed from inner top end of the arms 30, 31. The lamp receiving surfaces 32 are aligned with the longitudinal direction of the arms 30, 31. The parallel arrangement direction of the lamp receiving surfaces 32 is aligned with the parallel arrangement direction of the clod cathode tubes 18. In the present embodiment, each arm 30, 31 has nine sets of lamp receiving surfaces 32. The number of lamp receiving surfaces 32 sets is set to be greater than the number of cold cathode tubes 18 that are to be arranged. In the cross-sectional view of the arms 30, 31 with respect to their longitudinal direction, each lamp receiving surface 32 has across section of a substantially arc shape that is substantially fitted to the outer peripheral surface of the cold cathode tube 18. The curvature of the lamp receiving surface 32 is greater than that of the outer peripheral surface of the cold cathode tube 18. Specifically, each lamp receiving surface 32 has a depression depth that varies in a gradual manner along the longitudinal direction of the arm 30, 31. The depression depth is the greatest in the middle portion of each lamp receiving surface 32 and is the smallest at the two ends of each lamp receiving surface with respect to the longitudinal direction of the arm 30, 31. Each lamp receiving surface 32 has a substantially constant depression depth in the width direction of the arm 30, 31 (the axial direction of the cold cathode tube 18) (FIG. 6).

The adjacent lamp receiving surfaces 32 are directly connected to each other. Specifically, each end of the adjacent receiving surfaces 32 in the parallel arrangement direction of the lamp receiving surfaces 32 is connected to each other. Accordingly, the lamp receiving surfaces 32 are continuously formed to form a substantially corrugated surface without having a flat surface as a whole. Therefore, there is no space between the adjacent lamp receiving surfaces 32. The connected portion of the adjacent lamp receiving surfaces 32 has a pointed shape. Thus, the distance between the adjacent lamp receiving surfaces 32 is set to be the smallest possible value. This enables the arrangement position of the cold cathode tubes 18 to be designed precisely. The size of the lamp receiving surface 32 in the parallel arrangement direction of the cold cathode tubes 18 is greater than the diameter of each cold cathode tube 18. Each lamp receiving surface 32 formed on the upper arm 30 faces the corresponding lamp receiving surface 32 formed on the lower arm (in the Z-axis direction). The arrangement of the lamp receiving surfaces 32 on the upper arm 30 corresponds to that on the lower arm 31 in the parallel arrangement direction of the cold cathode tubes 18.

When the cold cathode tube 18 is positioned in the lamp holding portion 25, any one of the lamp receiving surfaces 32 sets aligned along the parallel arrangement direction of the cold cathode tubes 18 is freely selected to receive the cold cathode tube 18. This increases the variety of attachment positions of the cold cathode tube 18. This enables the lamp clip 20 to easily deal with the various arrangement patterns of the cold cathode tubes 18.

Each lamp clip 20 is attached to the chassis 14 as follows. As illustrated in FIG. 4, the chassis 14 has an upper portion and a lower portion with respect to a reference line L (middle portion in the screen) extending along the middle portion of the chassis 14 in the short-side direction. The lamp clips 20 in the upper portion of the chassis 14 are arranged so that the arms 30, 31 of each lamp holding portion 25 open toward the reference line L and each support pin 26 is disposed far from the reference line L (close to the end of the screen). The lamp clips 20 in the lower portion of the chassis 14 are arranged so that the arms 30, 31 open toward the reference line L. Namely, the lamp clips 20 are arranged symmetrically on the reference line L so that the lamp holding portions 25 open inwardly.

The lamp clip of the present embodiment has the above configuration and the operation thereof will be explained. The liquid crystal panel 11 and the backlight device 12 are manufactured independently and they are assembled to each other with using the bezel 13 and the like so as to manufacture the liquid crystal display device 10 illustrated in FIG. 2. Next, the assembling operation of the backlight device 12, especially the operations of attaching the lamp clip 20 to the chassis 14 and positioning the cold cathode tube 18 in the lamp clip 20 will be specifically explained.

Figure 7:
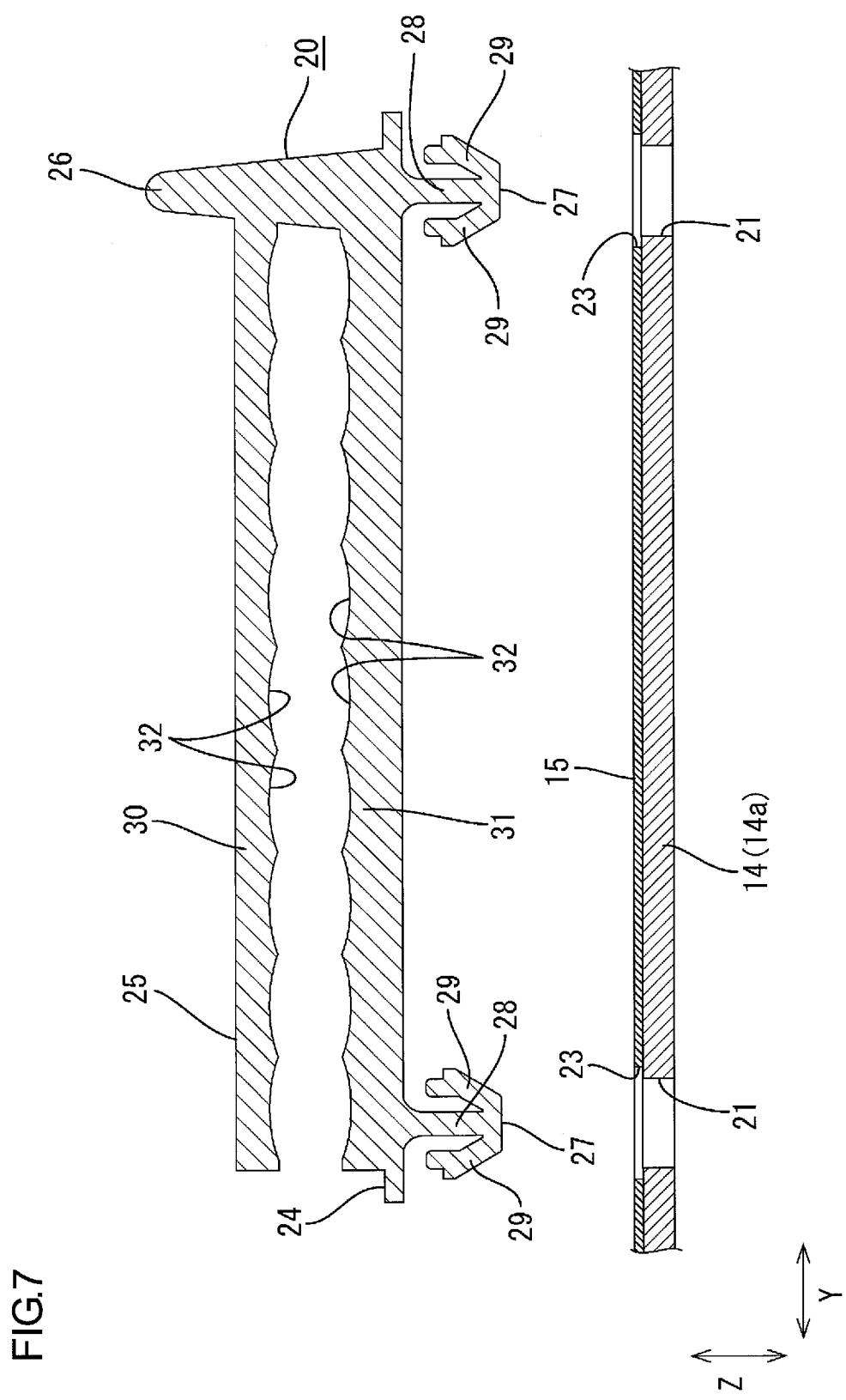
FIG. 7 is a cross-sectional view illustrating the lamp clip before being attached to the chassis.

The reflective sheet 15 is disposed in the chassis 14 so that each attachment opening 21 corresponds to each insertion opening 23 as illustrated in FIG. 7. Then, each lamp clip 20 is attached to the chassis 14. After holding the support pin 26 of the lamp clip 20, the lamp clip 20 is set so that the opening 33 of the lamp holding portion 25 opens toward the reference line L in the chassis 14 and each attachment portion 27 is positioned to correspond to each attachment opening 21 in the bottom plate 14a of the chassis 14 where the attachment portion 27 is to be attached. If the main body 24 is pressed from the front side toward the bottom plate 14a of the chassis 14 in this state, each attachment portion 27 is inserted in each corresponding attachment opening 21 from the distal end of the attachment portion 27 and the projection 29 is contacted to the front edge of the attachment opening 21. This makes the projection 29 to be elastically deformed to be close to the base portion 28.

If the lamp clip 20 is pressed so that the rear surface of the main body 24 abuts the bottom plate 14a of the chassis 14, the outer portion on the distal end of the projection 29 passes through the attachment opening 21 and projects from the rear surface of the bottom plate 14a. This restores the projection 29 to its original shape and the stopper surface of the outer portion abuts the edge of the attachment opening 21 on the rear side (FIG. 3). Accordingly, the edge of the attachment opening 21 in the bottom plate 14a of the chassis 14 and the edge of the insertion opening 23 in the reflective sheet 15 are held between the projection 29 of the attachment portion 27 and the main body 24. This maintains the lamp clip 20 to be attached to the chassis 14 having the reflective sheet 15 therebetween.

After each lamp clip 20 is attached to the chassis 14 as described above, the cold cathode tubes 18 are positioned in the lamp clip 20. From the state illustrated in FIG. 8, the cold cathode tube 18 is put in the chassis 14 along the Z-axis direction so as to be located at a side of the opening 33 of the lamp holding portion 25. When the cold cathode tube 18 is inserted in a set of lamp clips 20 close to the reference line L (the middle portion of the screen), it is placed in a space between the lamp holding members 25 of the set of lamp clips 20 and the holding members 25 of another set of lamp clips 20 close to the reference line L. When the cold cathode tube 18 is inserted in a set of lamp clips 20 close to each end of the screen, it is placed in a space between the lamp holding members 25 of the set of lamp clips 20 and the support pins 26 of the adjacent set of lamp clips 20 close to the reference line L.

Figure 8:
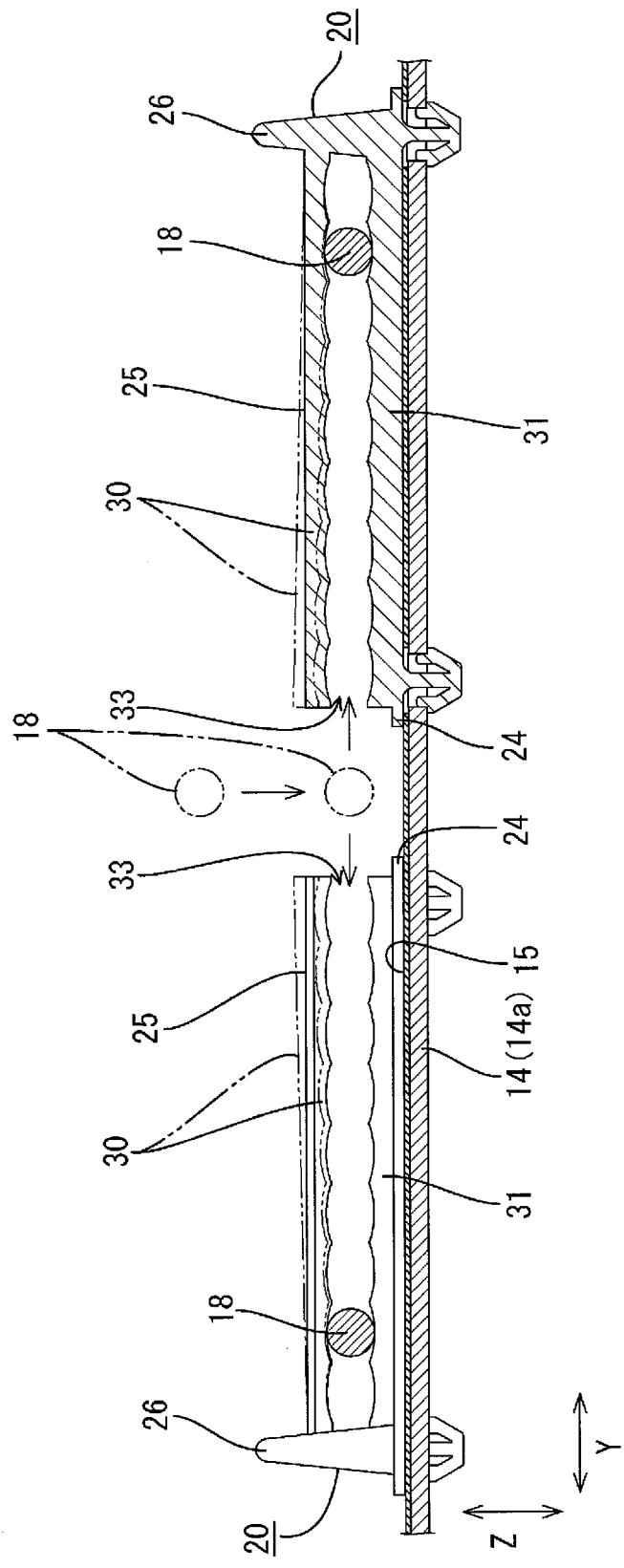
FIG. 8 is a cross-sectional view illustrating lamp holding portions into which a cold cathode tube is inserted.

The arm 30 is elastically deformed to enlarge its opening 33 from this state as illustrated by the alternate long and two short dashes lines in FIG. 8. This increases an opening size of the opening 33 and the cold cathode tube 18 is slid along the Y-axis direction. Then, the cold cathode tube 18 passes through the opening 33 and is moved in a space between the arms 30, 31 toward the support pin 26. Namely, the cold cathode tube 18 is moved from the middle portion to the end of the screen. The number of sets of lamp receiving surfaces 32 aligned on the inner surfaces of the arms 30, 31 is greater than the number of cold cathode tubes 18 that are to be arranged. Therefore, the cold cathode tube 18 is moved to a specific set of lamp receiving surfaces 32 that is suitable for the spec of the backlight device 12 so that the specific set of lamp receiving surfaces 32 receives the cold cathode tube 18. One of the sets of the lamp receiving surfaces 32 that is suitable for the position where the cold cathode tube 18 is to be positioned is selected and the selected set of lamp receiving surfaces 32 receives the cold cathode tube 18. If the arm 30 restores to its original shape in this state, the cold cathode tube 18 is fitted in a space between the upper and lower lamp receiving surfaces 32 and is held between the arms 30, 31 with its movement in the Y-axis direction being restricted.

If twelve cold cathode tubes 18 are arranged with the regular intervals arrangement as a spec of the backlight device 12, each set of lamp clips 20 holds three cold cathode tubes 18, as illustrated in FIG. 4. In such a case, the cold cathode tubes 18 are positioned in a space between the arms 30, 31 so that there are two sets of vacant lamp receiving surfaces 32 between the arranged adjacent cold cathode tubes 18. As to the attachment position of the lamp clips 20 in the chassis 14, the distance between the adjacent lamp clips 20 in the short-side direction of the chassis 14 is determined with considering the above-described interval between the cold cathode tubes 18 (the interval corresponding to two sets of lamp receiving surfaces 32).

After the cold cathode tubes 18 are positioned in the lamp clips 20 as described above, the holder 19 is attached to the chassis 14. Then, the diffuser plate 16a and each optical sheet 16b are laminated to be disposed on the holder 19. Thus, the backlight device 12 is assembled. The liquid crystal panel 11 is placed on the front side of the backlight device 12 to be held by the bezel 13. Accordingly, the liquid crystal display device 10 is assembled.

Figure 9:
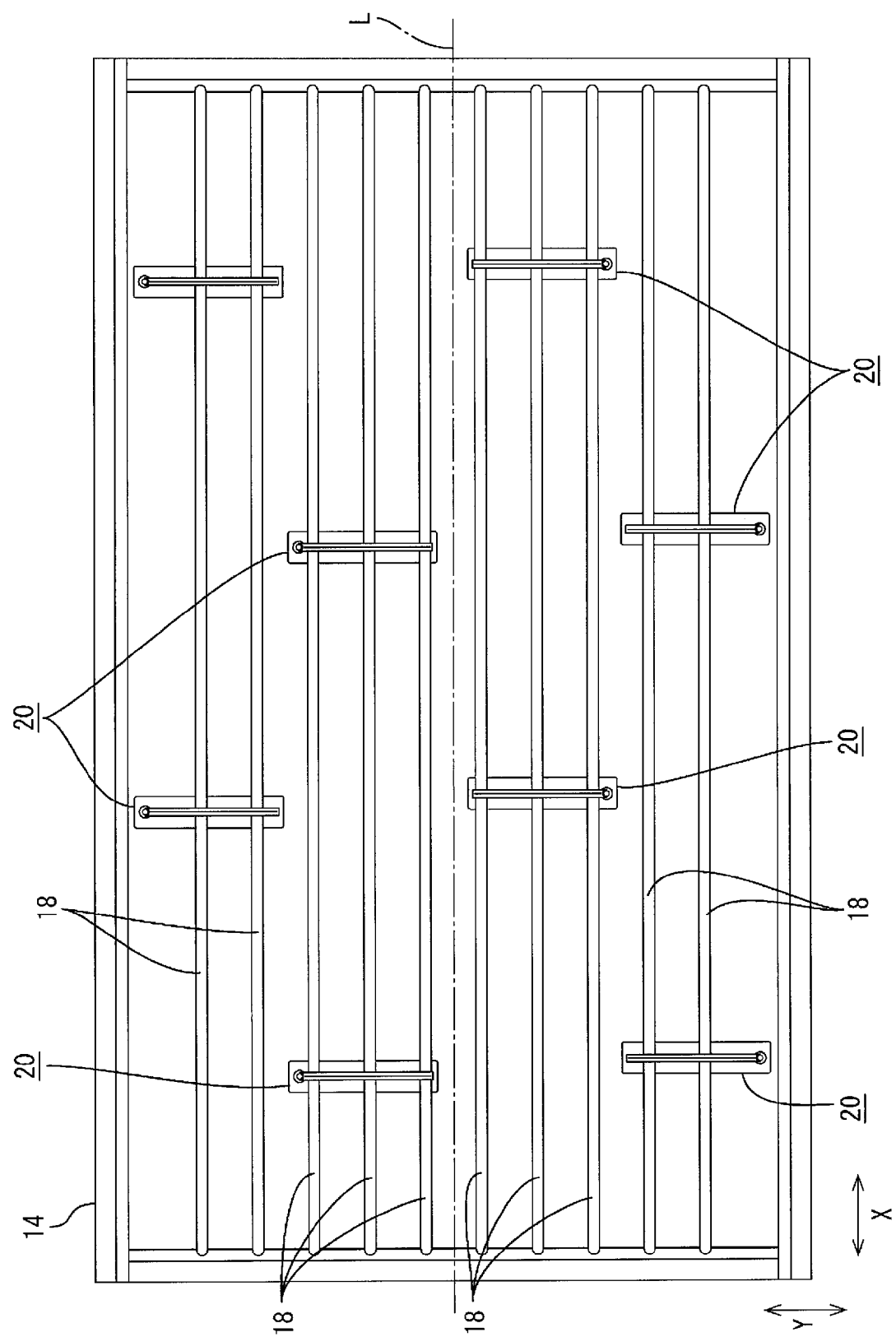
FIG. 9 is a plan view illustrating the chassis with the number of cold cathode tubes and an arrangement interval between the cold cathode tubes being changed.
Figure 10:
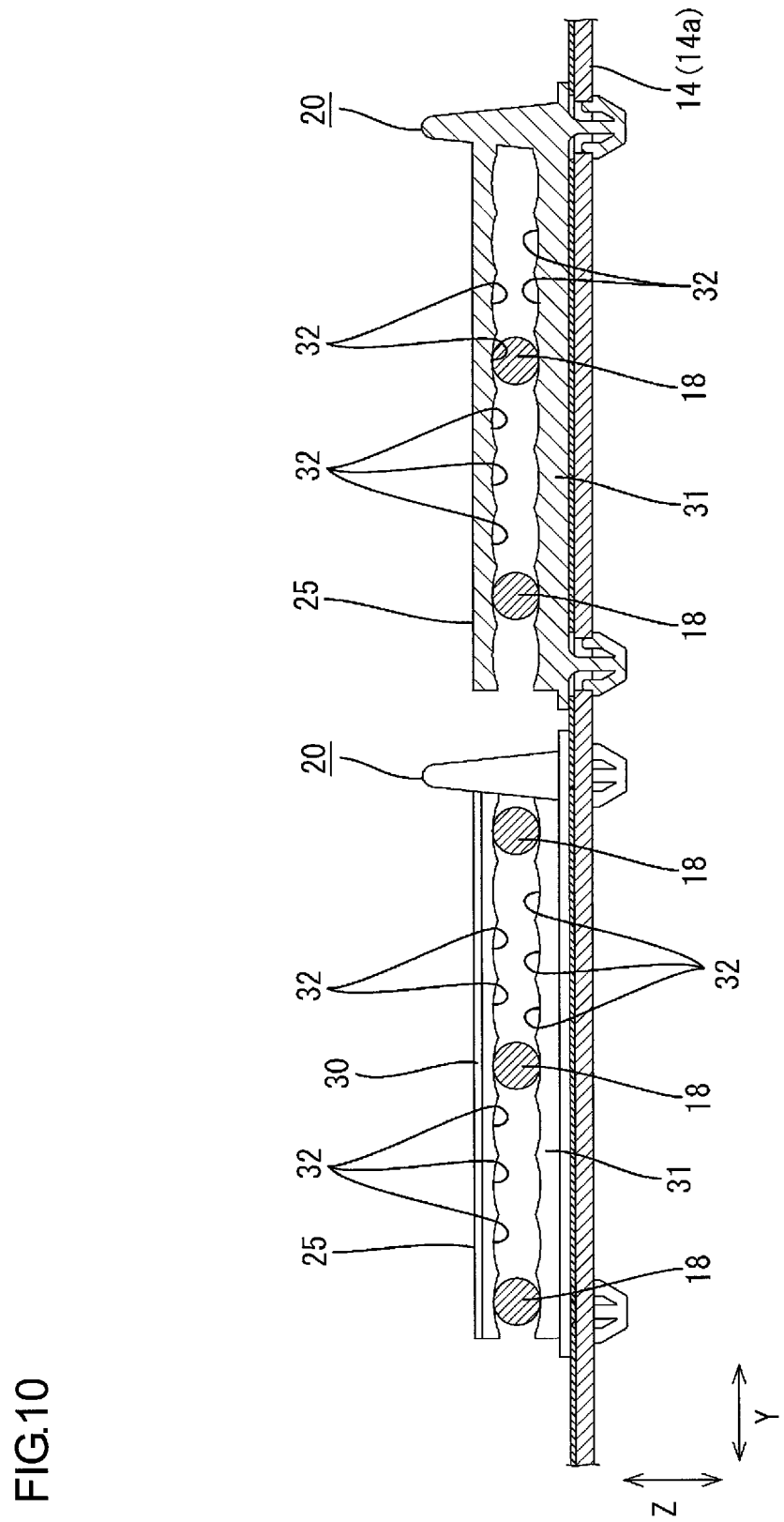
FIG. 10 is a cross-sectional view illustrating a liquid crystal display device with the number of cold cathode tubes and the arrangement interval between the cold cathode tubes being changed.

Other than the arrangement pattern illustrated in FIGS. 3 and 4, there are various arrangement patterns of the cold cathode tubes 18 corresponding to a screen size of the liquid crystal panel 11 or a spec of the backlight device 12. For example, even with a same screen size, a required specification (spec) such as brightness or a required manufacturing cost is different according to each model type (grade). Therefore, the number of cold cathode tubes 18 or the arrangement interval between the cold cathode tubes 18 may be changed. Specifically, if the number of cold cathode tubes 18 arranged in the chassis 14 is ten and it is smaller than that of cold cathode tubes 18 illustrated in FIGS. 3 and 4, the arrangement interval between the cold cathode tubes 18 is greater than that illustrated in FIGS. 3 and 4. In such a case, as illustrated in FIG. 9, the set of lamp clips 20 close to the middle portion of the screen holds three cold cathode tubes 18 and the set of lamp clips 20 close to the end of the screen holds two cold cathode tubes 18, and the arrangement position of the cold cathode tubes 18 in the lamp holding portion 25 is changed. Specifically, as illustrated in FIG. 10, the arrangement interval of the cold cathode tubes 18 is changed to correspond to three sets of lamp receiving surfaces 32. Each cold cathode tube 18 is selectively positioned between the specific set of lamp receiving surfaces 32 so as to maintain the arrangement interval. If the attachment position of the lamp clips 20 in the chassis 14 is required to be changed, the position of the attachment openings 21 in the chassis 14 may be changed without requiring changing the configuration of the lamp clip 20.

If the number of cold cathode tubes 18 is increased compared to the case illustrated in FIGS. 3 and 4, each set of lamp clips 20 holds the increased number of cold cathode tubes 18 and the arrangement interval of the cold cathode tubes 18 is decreased compared to that illustrated in FIGS. 3 and 4. As is not illustrated in the drawing, for example, the arrangement interval of the cold cathode tubes 18 may be changed to correspond to one set of lamp receiving surfaces 32. Each cold cathode tube 18 is selectively positioned between the specific set of lamp receiving surfaces 32 so as to maintain the arrangement interval. In such a case, if the attachment position of the lamp clips 20 in the chassis 14 is required to be changed, the configuration of the chassis 14 may be changed as described above. In the present embodiment, the maximum possible value of the arrangement interval of the cold cathode tubes 18 corresponds to one set of lamp receiving surfaces 32.

The arrangement interval of the cold cathode tubes 18 may be changed according to the screen size of the liquid crystal panel 11. In such a case, the number of cold cathode tubes 18 held by one set of lamp clips 20, a specific set of lamp receiving surfaces 32 that receives the cold cathode tube 18, and the number of sets of vacant lamp receiving surfaces 32 between the arranged cold cathode tubes 18 may be changed arbitrarily. If the attachment position of the lamp clips 20 in the chassis 14 is required to be changed, the configuration of the chassis 14 may be changed as described above.

Figure 11:
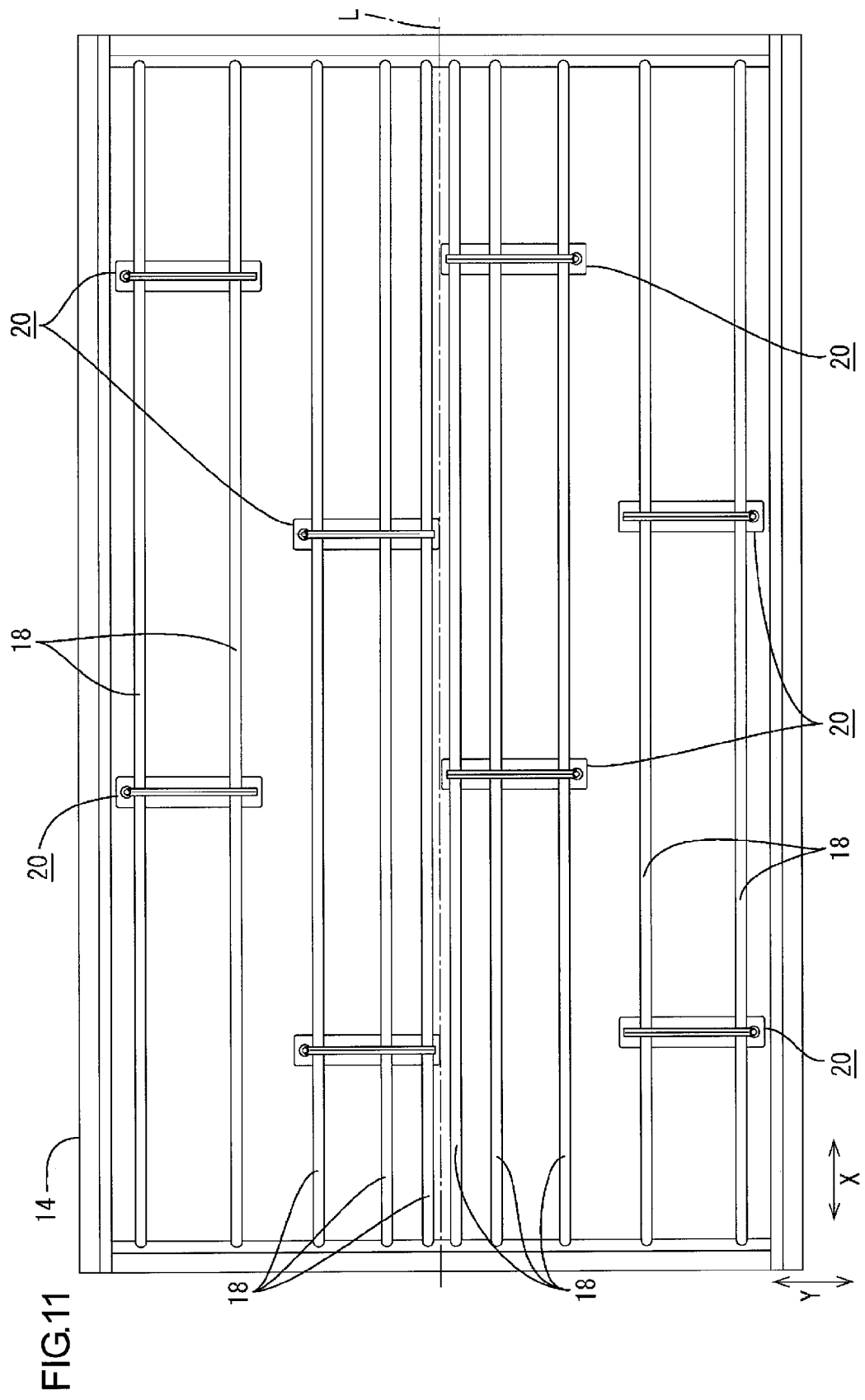
FIG. 11 is a plan view illustrating the chassis with the cold cathode tubes being in an irregular intervals arrangement.
Figure 12:
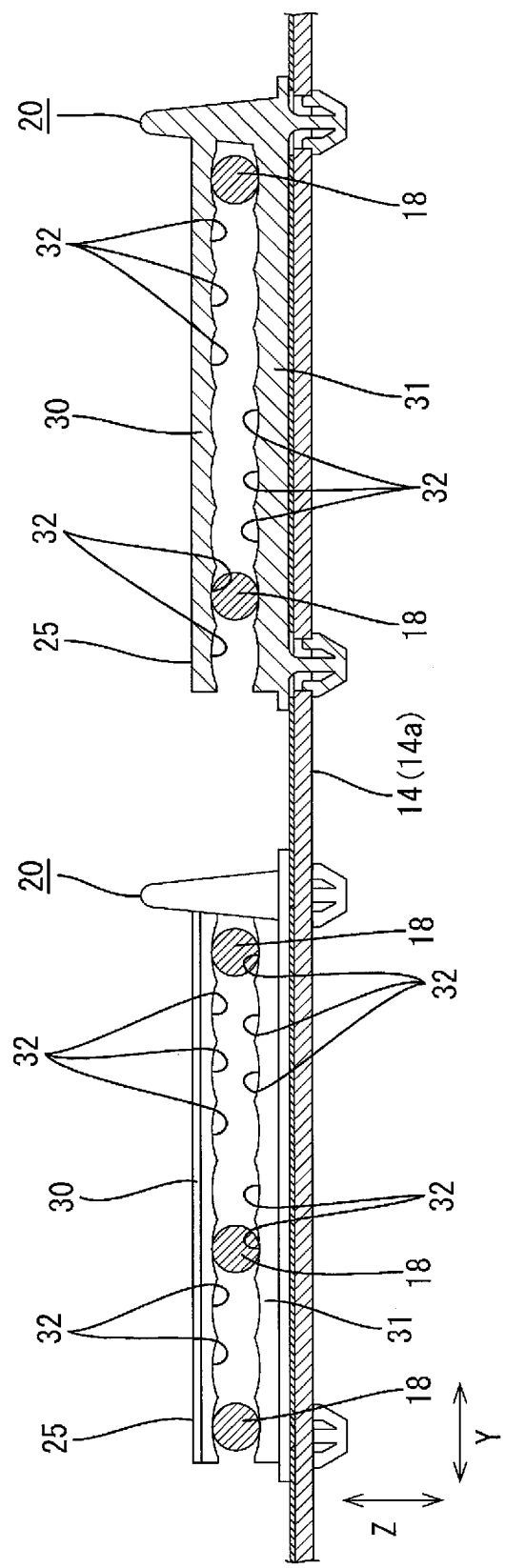
FIG. 12 is a cross-sectional view illustrating the liquid crystal display device with the cold cathode tubes being in the irregular intervals arrangement.

The arrangement pattern of the cold cathode tubes 18 includes an irregular intervals arrangement in addition to the regular intervals arrangement. In the irregular intervals arrangement, the arrangement interval of the cold cathode tubes 18 varies according to the arrangement position of the lamp clips in the chassis 14. In the irregular intervals arrangement, the interval between the adjacent cold cathode tubes 18 is smaller as it is closer to the middle portion of the screen, and the interval is greater as it is closer to the end of the screen. This improves brightness of the middle portion of the screen. Specifically, in the irregular intervals arrangement, ten cold cathode tubes 18 are arranged in the backlight device 12 as described below. As illustrated in FIG. 11, the number of cold cathode tubes 18 held by the set of lamp clips 20 close to the middle portion of the screen is increased (three, for example), and the number of cold cathode tubes 18 held by the set of lamp clips 20 close to the end of the screen is decreased (two, for example). Also, the arrangement position of the cold cathode tubes 18 in the lamp holding portion 25 is changed so that the arrangement interval between the cold cathode tubes 18 is relatively small in the middle portion of the screen and the arrangement interval between the cold cathode tubes 18 is relatively large in the end of the screen. Specifically, the arrangement interval between the cold cathode tubes 18 closest to the end of the screen corresponds to six sets of lamp receiving surfaces 32. The arrangement interval between the cold cathode tubes 18 is decreased in a gradual manner from the end of the screen as it gets closer to the middle portion of the screen. The arrangement interval between the cold cathode tubes 18 closest to the middle portion of the screen corresponds to two sets of lamp receiving surfaces 32. If the attachment position of the lamp clips 20 in the chassis 14 is required to be changed, the configuration of the chassis 14 may be changed as described above.

Figure 13:
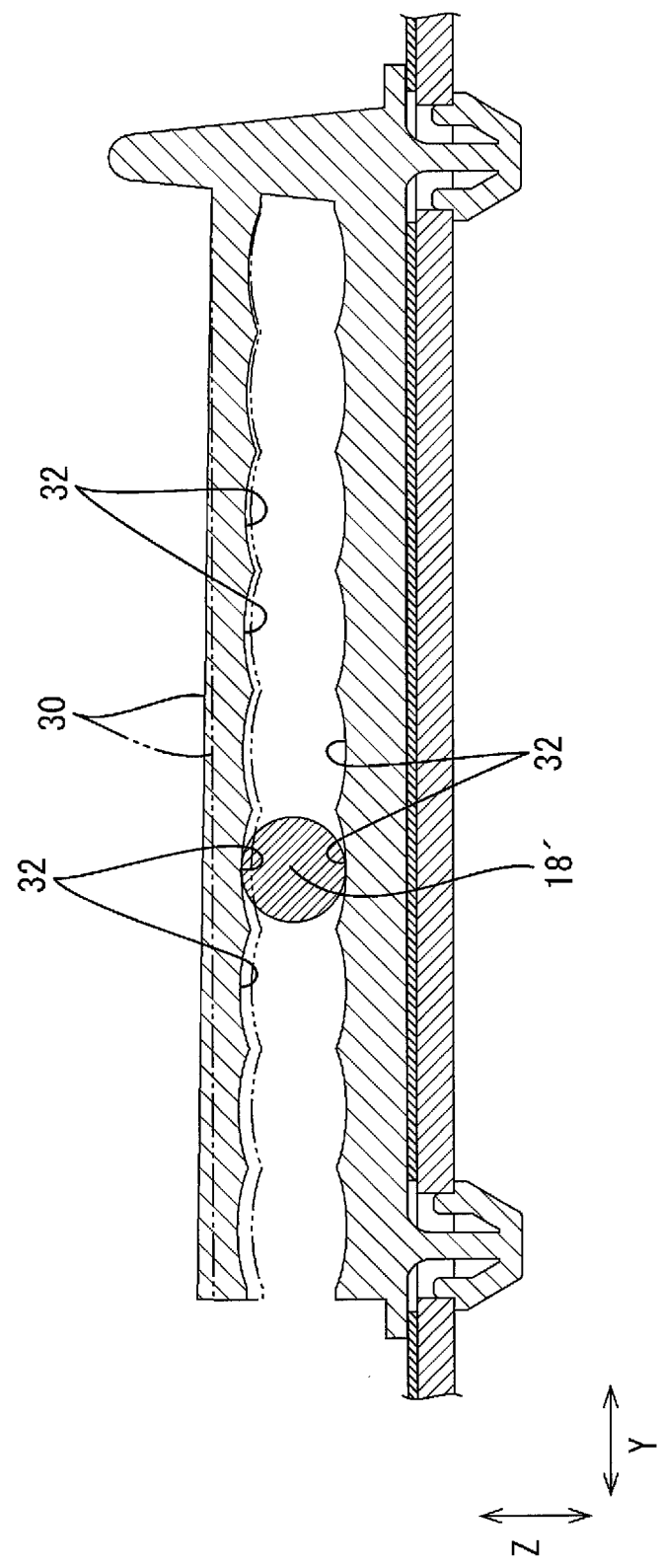
FIG. 13 is a cross-sectional view illustrating the liquid crystal display device with a diameter of the cold cathode tube being changed.

The diameter of the cold cathode tube 18 used for the backlight device 12 may be changed. For example, if a cold cathode tube 18' having a greater diameter than that in FIGS. 3 and 4 is held between the arms 30, 31, the upper arm 30 is deformed to enlarge the opening, as illustrated in FIG. 13. Thus, the cold cathode tube 18' is fitted in a space between the upper and lower lamp receiving surfaces 32 to be appropriately held therebetween. In the present embodiment, a pair of arms 30, 31 holding the cold cathode tube 18 therebetween extends along the parallel arrangement direction of the cold cathode tubes 18. Therefore, compared to the configuration of the conventional lamp holding portion having a pair of arms opening toward the optical member, the arms 30, 31 have low elasticity. Therefore, if a cold cathode tube 18' having a relatively large diameter is held in the lamp holding portion, the arm 30 may contact the cold cathode tube 18' at the time of insertion and removal of the cold cathode tube 18'. Even in such a case, since the restoring force of the elastically deformed arm 30 is relatively small, the cold cathode tube 18' is less likely to be broken or damaged. As is not illustrated in the drawing, a cold cathode tube 18 having a relatively small diameter may be held in the lamp holding portion.

As is explained above, according to the present embodiment, the lamp clip 20 holds at least one of the cold cathode tubes 18 that are aligned so as to be parallel to each other. The lamp clip 20 includes a pair of arms 30, 31 that extends along the parallel arrangement direction of the cold cathode tubes 18 and has the opening 33 between their distal ends so as to allow insertion and removal of the cold cathode tube 18. The arms 30, 31 hold the cold cathode tube 18 therebetween. A plurality of lamp receiving surfaces 32 that receive the cold cathode tube 18 are formed on at least one of the surfaces of the arms 30, 31 facing the cold cathode tube 18 and the lamp receiving surfaces 32 are aligned along the parallel arrangement direction of the cold cathode tubes 18.

When the cold cathode tube 18 is inserted through the opening 33 between the distal ends of the arms 30, 31, the cold cathode tube 18 is held between the arms 30, 31. In this state, the cold cathode tube 18 is selectively received by one of the sets of the lamp receiving surfaces 32 that are aligned on the surfaces of the arms 30, 31 facing the cold cathode tube 18. This increases variety of arrangement position of the cold cathode tubes 18 in the parallel arrangement direction of the cold cathode tubes 18. Accordingly, the lamp clip 20 deals with various arrangement patterns of the cold cathode tubes 18. This decreases the number of required types of the lamp clips 20.

Like a conventional art, if each lamp holding portion opens toward the optical member (vertically) and a plurality of lamp holding portions are arranged on the main body, a space that allows elastic deformation of each arm is required to be ensured between the adjacent lamp holding portions. This increases an interval between the possible arrangement positions of the cold cathode tubes. If the cold cathode tube is attached to a wrong lamp holding portion, the cold cathode tube is required to be removed therefrom and attached to a correct lamp holding portion again. This deteriorates workability and increases a load on the cold cathode tube at its attachment and removal.

In the present embodiment, each lamp holding portion 25 is arranged to open in the parallel arrangement direction of the cold cathode tubes 18 (horizongally) and the cold cathode tube 18 is inserted from the opening of the lamp holding portion 25 along the parallel arrangement direction, and a plurality of lamp receiving surfaces 32 are formed on the inner surfaces of the arms 30, 31. This decreases an interval between the lamp receiving surfaces 32, that is an interval between the possible arrangement positions of the cold cathode tube 18 compared to the conventional art. Accordingly, the lamp clip 20 deals with various arrangement intervals between the cold cathode tubes 18 and this makes the device to be designed more freely. If the cold cathode tube 18 is held by a wrong set of lamp receiving surfaces 32, it is moved to a correct set of lamp receiving surfaces 32 with being held in a space between the arms 30, 31. This improves workability and decreases a load on the cold cathode tube 18 at its insertion and removal and the cold cathode tube 18 is less likely to be damaged.

The adjacent lamp receiving surfaces 32 are continuously formed from each other. Thus, there is no interval between the adjacent lamp receiving surfaces 32. This enables the arrangement position of the cold cathode tubes 18 to be designed precisely and to be selected freely.

The interval between the adjacent lamp receiving surfaces 32 is smaller than the minimum possible interval between the cold cathode tubes 18. Accordingly, the arrangement position of the cold cathode tubes 18 is designed more precisely.

Each lamp receiving surface 32 is formed by depressing the surface of the arm 30, 31 facing the cold cathode tube 18. Therefore, compared to the lamp receiving surface formed by projecting the surfaces of the arms facing the cold cathode tube 18, for example, the space between the arms 30, 31 is reduced and this is preferable to reduce the device in size.

Each lamp receiving surface 32 is formed in a substantially arc shape along the outer peripheral surface of the cold cathode tube 18. This appropriately supports the cold cathode tube 18.

The lamp receiving surfaces 32 are provided on both of the arms 30, 31. Therefore, the lamp receiving surfaces 32 are formed on both of the arms 30, 31 that hold the cold cathode tube 18 therebetween. This improves a property of holding the cold cathode tube 18.

A plurality of cold cathode tubes 18 may be held in a space between the arms 30, 31. The number of sets of lamp receiving surfaces 32 is greater than that of cold cathode tubes 18 that are to be arranged. Accordingly, it is preferable to position a plurality of cold cathode tubes 18 in a space between the arms 30, 31.

The lamp clip 20 includes the support pin 26 that supports the optical member 16 provided to face the cold cathode tube 18. The arms 30, 31 are continuously formed from the support pin 26. Since the arms 30, 31 are continuously formed from the support pin 26 that supports the optical member 16, the configuration of the lamp clip is simplified.

A convex portion is formed on a surface of the arm 30 opposite from the cold cathode tube 18. Accordingly, light emitted from the cold cathode tubes 18 reflects off the surface of the convex portion on the arm 30 effectively.

The main body 24 is formed in a substantially plate extending in the axial direction and the parallel arrangement direction of the cold cathode tubes 18. The arms 30, 31 are formed so as to be provided within the area of the main body 24 in the axial direction and the parallel arrangement direction. Accordingly, the arms 30, 31 are protected by the main body 24 and other parts are less likely to contact the arms 30, 31.

The main body 24 is formed in a substantially plate extending in the axial direction and the parallel arrangement direction of the cold cathode tubes 18. One of the arms 30, 31 that is adjacent to the main body 24 is formed continuously from the main body 24. This improves strength of the arms 30, 31 that are formed continuously from the main body 24.

The arms 30, 31 are formed integrally with each other. Accordingly, a manufacturing cost is reduced compared to a case in that the arms are formed from independent parts.

The backlight device 12 of the present embodiment comprises the lamp clips 20, the cold cathode tubes 18 that are held by the lamp clips 20, and the chassis 14. The cold cathode tubes 18 are arranged in the chassis 14 and the lamp clips 20 are attached to the chassis 14. The lamp clips 20 are attached to the chassis so that each opening 33 opens toward the middle portion of the chassis 14. In the middle portion of the chassis 14, there is less objects that may be obstacles when the cold cathode tube 18 is inserted to and removed from the lamp clip 20, compared to the ends of the chassis 14 having lifted side rims. This improves workability of the insertion and removal of the cold cathode tubes 18.

Second Embodiment

A second embodiment of the present invention will be explained with reference to FIG. 14. In the second embodiment, the configuration of lamp receiving surfaces 32-A is changed. In the second embodiment, the parts that are changed from the first embodiment are indicated by the same symbols with "-A" added, and the configuration, operations and effects will not be described to avoid repetition.

Figure 14:
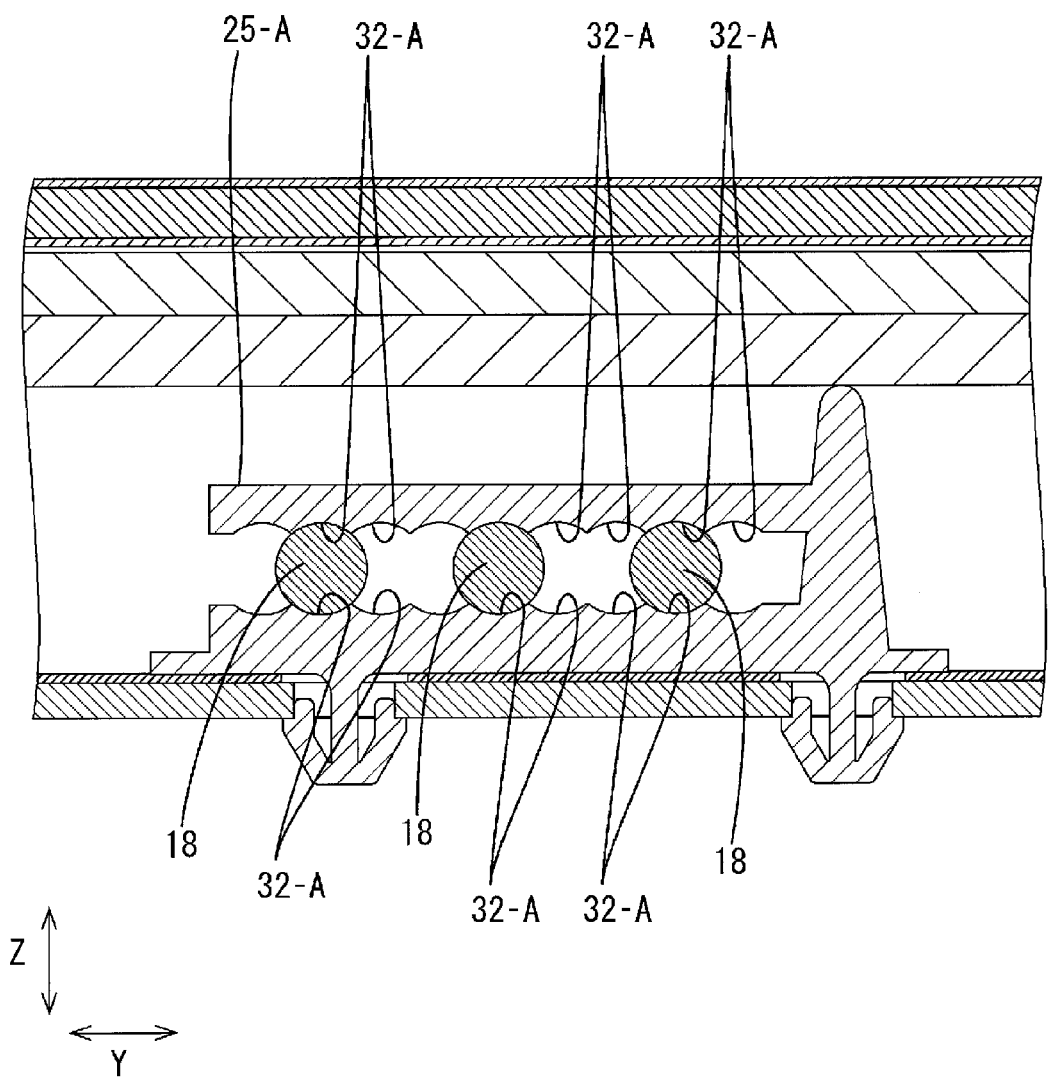
FIG. 14 is a cross-sectional view illustrating a lamp clip according to a second embodiment of the present invention.

The size of each lamp receiving surface 32-A in the parallel arrangement direction of the cold cathode tubes 18 is smaller than the diameter of the cold cathode tube 18 as illustrated in FIG. 14. Therefore, in the state that the cold cathode tube 18 is positioned in the lamp holding portion, a part of the cold cathode tube 18 intrudes into the adjacent lamp receiving surface 32-A. If the cold cathode tubes 18 are positioned in the lamp holding portion 25-A at smallest possible arrangement intervals considering a matter of design, there is one set of vacant lamp receiving surfaces 32-A between the cold cathode tubes 18. In this state, the interval between the cold cathode tubes 18 (the minimum arrangement interval) is smaller than the size of each lamp receiving surface 32-A in the parallel arrangement direction of the cold cathode tubes 18 by the size of the portion of each cold cathode tube 18 intruding into the vacant lamp receiving surface 32-A. Since there is no space between the adjacent lamp receiving surfaces 32-A, the minimum arrangement interval between the cold cathode tubes 18 could be smaller than the space between the adjacent lamp receiving surfaces 32-A. Since the size of each lamp receiving surface 32-A in the parallel arrangement direction of the cold cathode tubes 18 is decreased as much as possible, the arrangement position of the cold cathode tubes 18 is designed precisely.

As is explained above, according to the present embodiment, the size of each lamp receiving surface 32-A in the parallel arrangement direction of the cold cathode tubes 18 is smaller than the diameter of the cold cathode tube 18. Accordingly, the arrangement position of the cold cathode tubes 18 is designed quite precisely.

Third Embodiment

A third embodiment of the present invention will be explained with reference to FIG. 15. In the third embodiment, the configuration of lamp receiving surfaces 32-B is changed. In the third embodiment, the parts that are changed from the first embodiment are indicated by the same symbols with "-B" added, and the configuration, operations and effects will not be described to avoid repetition.

Figure 15:
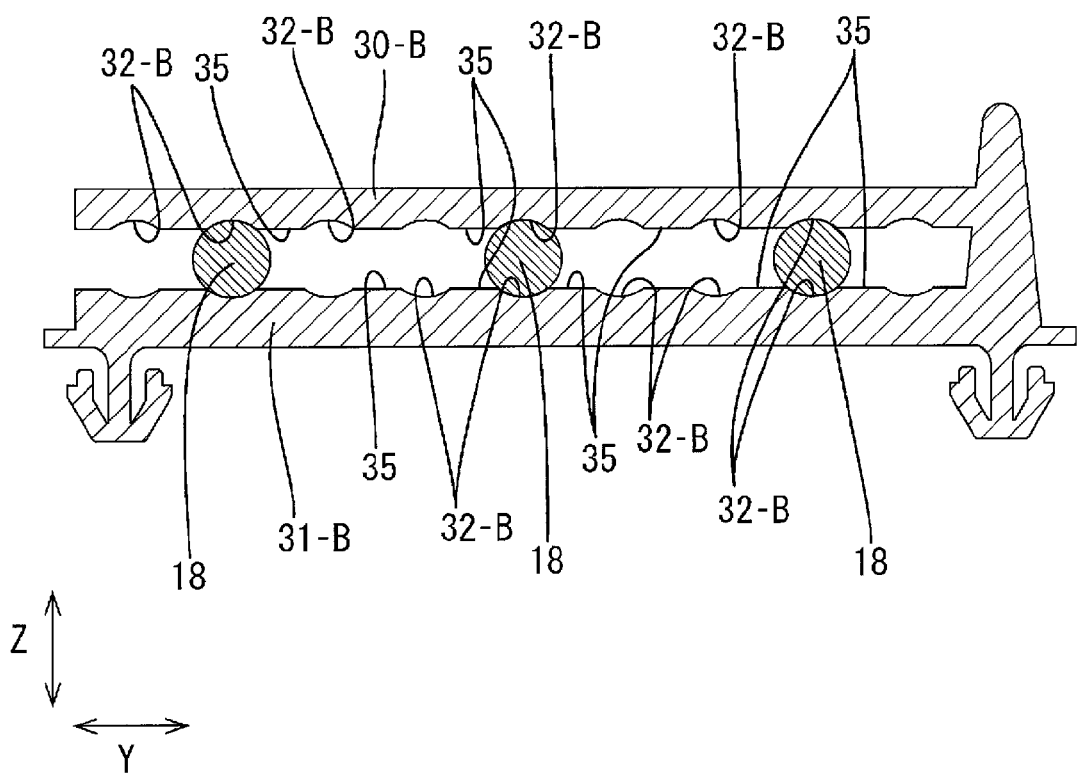
FIG. 15 is a cross-sectional view illustrating a lamp clip according to a third embodiment of the present invention.

As illustrated in FIG. 15, each lamp receiving surface 32-B is not directly connected to each other on an inner surface of each arm 30-B, 31-B but aligned with having a space therebetween. Specifically, there is a flat surface 35 that is a part of the inner surface of the arm 30-B, 31-B between the adjacent lamp receiving surfaces 32-B. This prevents the ends of the adjacent lamp receiving surfaces 32-B from being connected to each other. Namely, there is a space corresponding to the size of the flat surface 35 in the Y-axis direction (the parallel arrangement direction of the cold cathode tubes 18) between the adjacent lamp receiving surfaces 32-B. In the state that the cold cathode tube 18 is positioned between a set of lamp receiving surfaces 32-B, a part of the cold cathode tube 18 intrudes into the flat surface 35 by a predetermined amount from each edge of the lamp receiving surfaces 32-B. The intrusion amount is smaller than a half of the size of the flat surface 35 in the Y-axis direction. Therefore, when the cold cathode tube 18 is positioned between a set of lamp receiving surfaces 32-B, the cold cathode tube 18 positioned between the set of lamp receiving surfaces 32-B does not intrude into the adjacent lamp receiving surfaces 32-B and no vacant lamp receiving surfaces 32-B exists between the cold cathode tubes 18. Accordingly, the interval between the adjacent lamp receiving surfaces 32-B is smaller than the minimum possible arrangement interval between the cold cathode tubes 18. With the above configuration of the lamp receiving surfaces 32-B, the arrangement position of the cold cathode tubes 18 is freely selected. Therefore, the device having such a configuration easily deals with various arrangement patterns of the cold cathode tubes 18.

Fourth Embodiment

A fourth embodiment of the present invention will be explained with reference to FIG. 16. In the fourth embodiment, the arrangement of lamp clips 20-C on the chassis 14 is changed. In the fourth embodiment, the parts that are changed from the first embodiment are indicated by the same symbols with "-C" added, and the configuration, operations and effects will not be described to avoid repetition.

Figure 16:
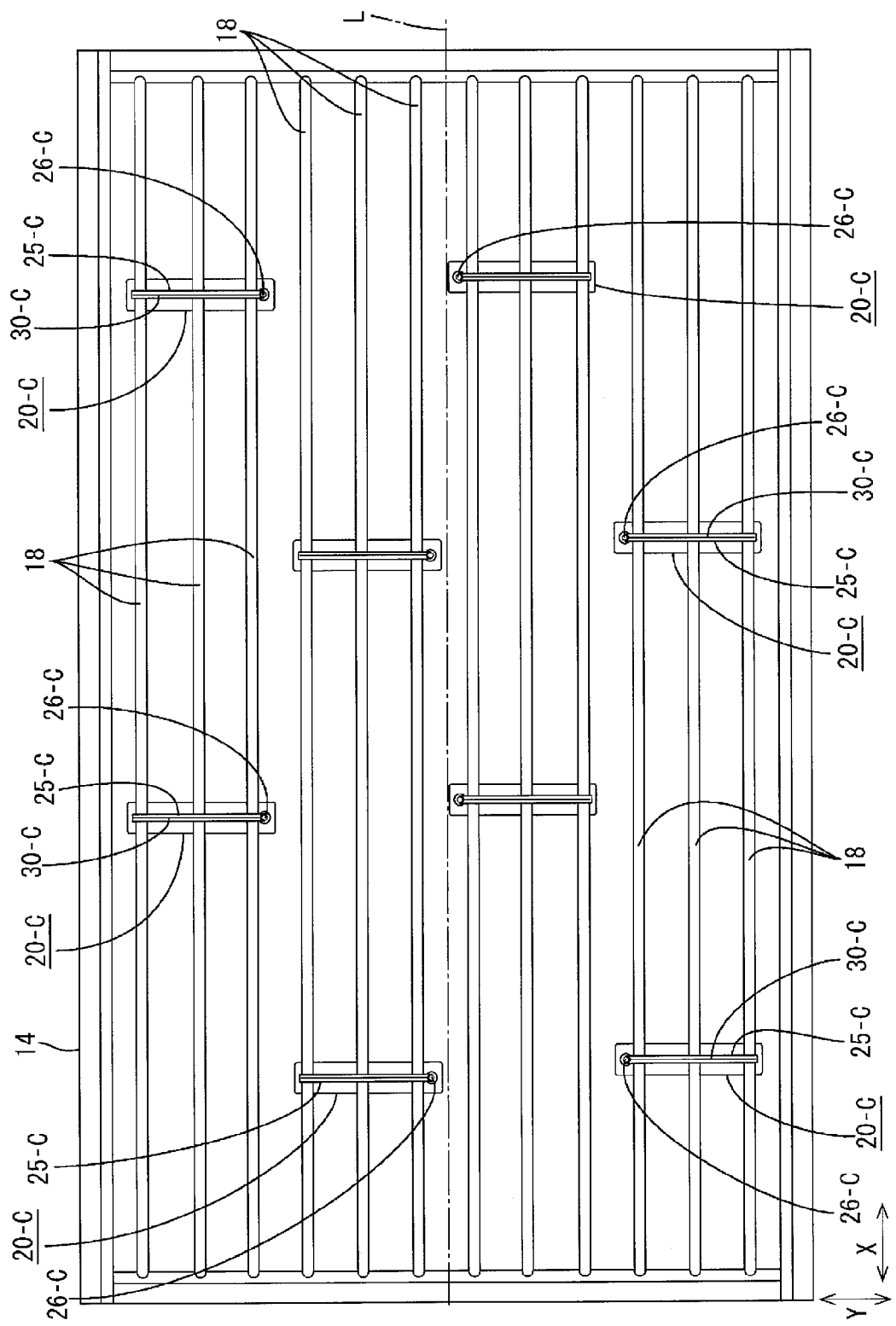
FIG. 16 is a plan view illustrating a chassis including lamp clips according to a fourth embodiment of the present invention.

The lamp clips 20-C are arranged in a portion of the chassis 14 that is upper from the reference line L in FIG. 16 so that the arms 30-C, 31-C of the lamp holding portion 25-C open toward a direction opposite from the reference line L and the support pin 26-C is located close to the reference line L. The lamp clips 20-C are arranged in a portion of the chassis 14 that is lower than the reference line L in FIG. 16 so that the arms 30-C, 31-C open toward a direction opposite from the reference line L. Namely, the lamp clips 20-C are arranged symmetrically on either side of the reference line L so that all lamp holding portions 25-C open outwardly. Therefore, when the cold cathode tube 18 is held in the lamp clip 20-C, it is put in the chassis 14 and inserted into the lamp holding portion 25-C from a side opposite from the reference line L.

Fifth Embodiment

A fifth embodiment of the present invention will be explained with reference to FIG. 17. In the fifth embodiment, the arrangement of lamp clips 20-D on the chassis 14-D is further changed. In the fifth embodiment, the parts that are changed from the first embodiment are indicated by the same symbols with "-D" added, and the configuration, operations and effects will not be described to avoid repetition.

Figure 17:
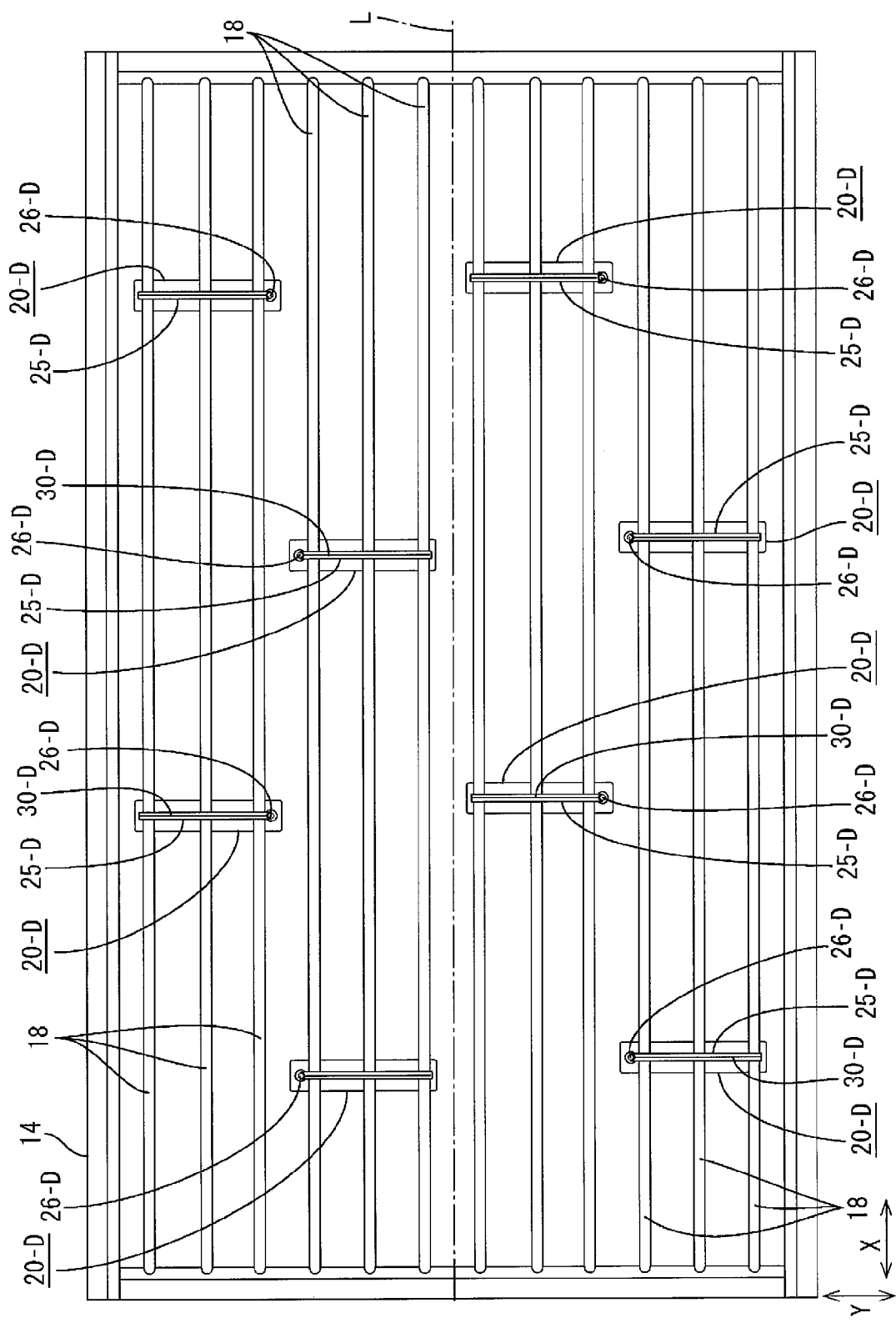
FIG. 17 is a plan view illustrating a chassis including lamp clips according to a fifth embodiment of the present invention.

The lamp clips 20-D in the chassis 14 close to the reference line L are arranged so that the arms 30-D, 31-D of the lamp holding portion 25-D open toward the reference line L as illustrated in FIG. 17. The lamp clips 20-D away from the reference line L, that is, close to the ends of the screen are arranged so that the arms 30-D, 31-D open toward a direction opposite from the reference line L. Namely, the lamp clips 20-D are arranged symmetrically on either side of the reference line L so that the lamp holding portions 25-D close to the middle portion of the screen open inwardly and the lamp holding portions 25-D close to the ends of the screen open outwardly. Therefore, when the cold cathode tube 18 is positioned in the lamp clip 20 close to the middle portion of the screen, it is put in the chassis 14 and inserted into the lamp holding portion 25-D from a side close to the reference line L. When the cold cathode tube 18 is positioned in the lamp clip 20 close to the end of the screen, it is put in the chassis 14 and inserted into the lamp holding portion 25-D from a side opposite from the reference line L.

Sixth Embodiment

A Sixth embodiment of the present invention will be explained with reference to FIG. 18. In the sixth embodiment, lamp receiving surfaces 32-E are formed on only one arm 30-E. In the sixth embodiment, the parts that are changed from the first embodiment are indicated by the same symbols with "-E" added, and the configuration, operations and effects will not be described to avoid repetition.

Figure 18:
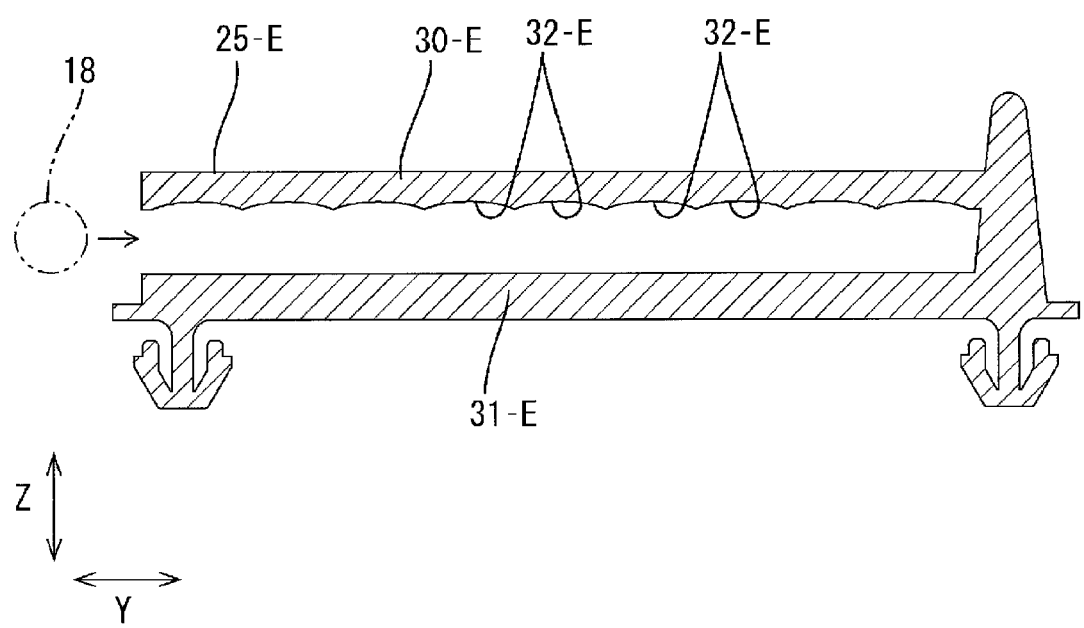
FIG. 18 is a cross-sectional view illustrating a lamp clip according to a sixth embodiment of the present invention.

Among the arms 30-E, 31-E, a plurality of lamp receiving surfaces 32-E are formed on the arm 30-E close to the optical member 16 and no lamp receiving surface 32-E is formed on the arm 31-E close to the chassis 14 as illustrated in FIG. 18. An inner surface of the arm 31-E close to the chassis 14 is a flat surface that is substantially parallel to the axial direction and the parallel arrangement direction of the cold cathode tubes 18. Accordingly, the cold cathode tube 18 is slid on the surfaces of the arms 30-E, 31-E smoothly when it is inserted to and removed from the lamp holding portion 25-E. This improves workability of the insertion and removal of the cold cathode tube 18.

Seventh Embodiment

A Seventh embodiment of the present invention will be explained with reference to FIG. 19. In the seventh embodiment, lamp receiving surfaces 32-F are formed on only one arm 31-F. In the seventh embodiment, the parts that are changed from the first embodiment are indicated by the same symbols with "-F" added, and the configuration, operations and effects will not be described to avoid repetition.

Figure 19:
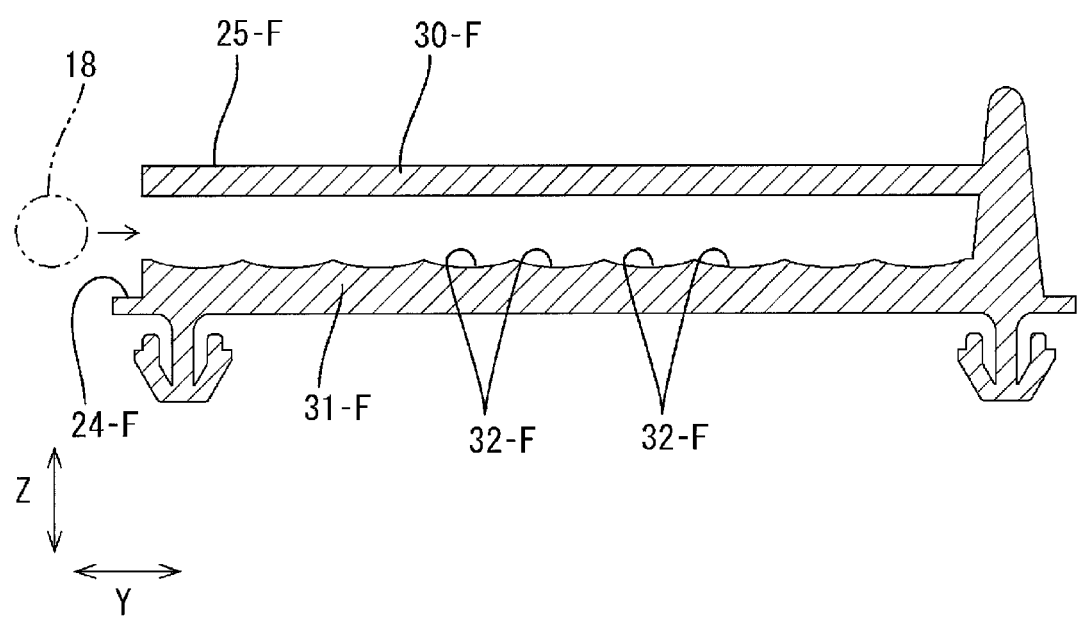
FIG. 19 is a cross-sectional view illustrating a lamp clip according to a seventh embodiment of the present invention.

Among the arms 30-F, 31-F, a plurality of lamp receiving surfaces 32-F are formed on the arm 31-F close to the chassis 14 (main body 24-F) and no lamp receiving surface 32-F is formed on the arm 30-F close to the optical member 16 as illustrated in FIG. 19. An inner surface of the arm 30-F close to the optical member 16 is a flat surface that is substantially parallel to the axial direction and the parallel arrangement direction of the cold cathode tubes 18. Accordingly, the cold cathode tube 18 is slid on the surfaces of the arms 30-E, 31-E smoothly when it is inserted to and removed from the lamp holding portion 25-F. This improves workability of the insertion and removal of the cold cathode tube 18.

Eighth Embodiment

An Eighth embodiment of the present invention will be explained with reference to FIG. 20. In the eighth embodiment, a lamp holding portion 25-G is formed independently of a support pin 26-G. In the eighth embodiment, the parts that are changed from the first embodiment are indicated by the same symbols with "-G" added, and the configuration, operations and effects will not be described to avoid repetition.

Figure 20:
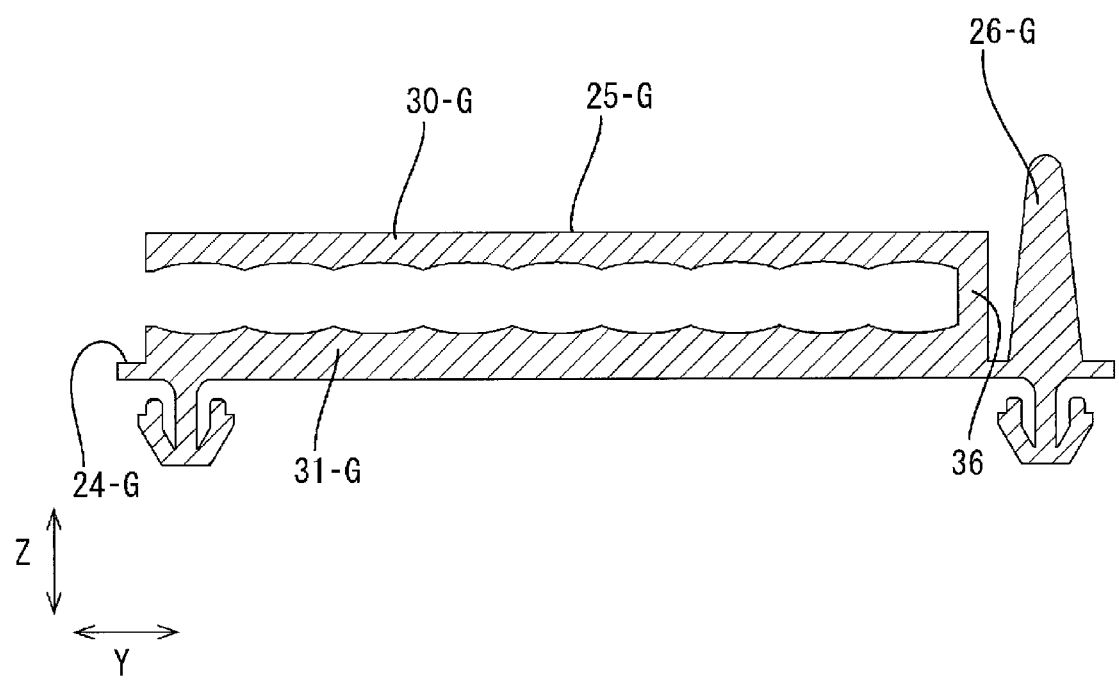
FIG. 20 is a cross-sectional view illustrating a lamp clip according to an eighth embodiment of the present invention.

As illustrated in FIG. 20, the lamp holding portion 25-G comprises a pair of arms 30-G, 31-G and a support portion 36 connecting basal ends of the arms 30-G, 31-G. The support portion 36 is formed continuously from the arms 30-G, 31-G and also from a main body 24-G. Accordingly, the support portion 36 supports the arm 30-G close to the optical member 16 so that the arm 30-G is elastically deformed. The arms 30-G, 31-G are formed separately from the support pin 26-G and are connected to the main body 24-G without the support pin 26-G intervening therein.

Ninth Embodiment

A ninth embodiment of the present invention will be explained with reference to FIG. 21. In the ninth embodiment, the number of lamp holding portions 25-H provided in one lamp lip 20-H is changed. In the ninth embodiment, the parts that are changed from the first embodiment are indicated by the same symbols with "-H" added, and the configuration, operations and effects will not be described to avoid repetition.

Figure 21:
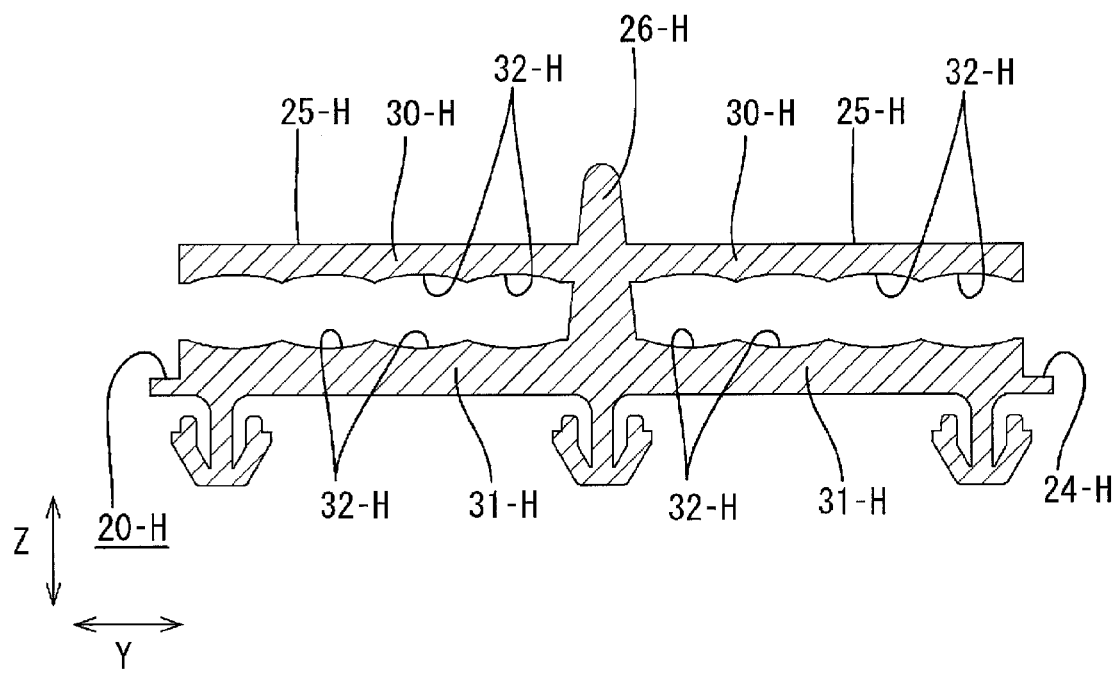
FIG. 21 is a cross-sectional view illustrating a lamp clip according to a ninth embodiment of the present invention.

As illustrated in FIG. 21, a pair of lamp holding portions 25-H is integrally formed with the lamp clip 20-H. The support pin 26-H is provided at a substantially middle portion of the main body 24-H in its long-side direction. The lamp holding portion 25-H is provided at either side of the support pin 26-H. The lamp holding portion 25-H is provided at either side of the support pin 26-H along the parallel arrangement direction of the cold cathode tubes 18. Each lamp holding portion 25-H has a pair of arms 30-H, 31-H each extending along the parallel arrangement direction of the cold cathode tubes 18. A basal end of each arm 30-H, 31-H is connected to a side surface of the support pin 26-H. Four sets of lamp receiving surfaces 32-H are formed on inner surfaces of each arm 30H, 31-H along the parallel arrangement direction of the cold cathode tubes 18. The cold cathode tube 18 is selectively positioned between the lamp receiving surfaces 32-H.

Tenth Embodiment

Figure 22:
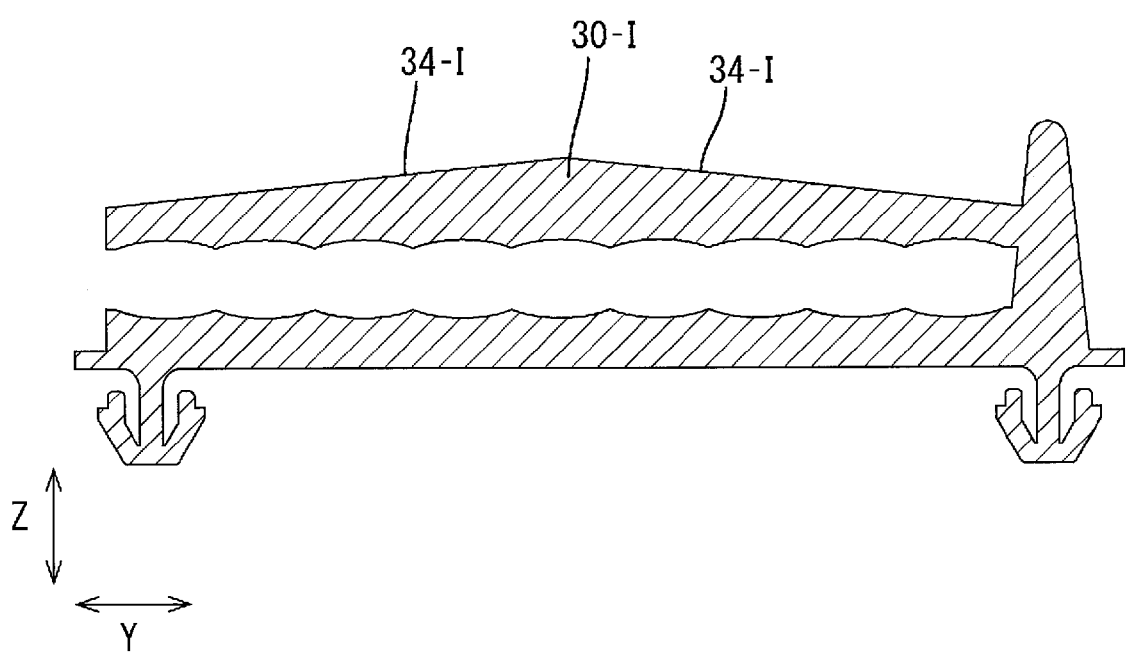
FIG. 22 is a cross-sectional view illustrating a lamp clip according to a tenth embodiment of the present invention.

A tenth embodiment of the present invention will be explained with reference to FIG. 22. In the tenth embodiment, a sloped surface 34-I formed on the arm 30-I close to the optical member 16 is changed. In the tenth embodiment, the parts that are changed from the first embodiment are indicated by the same symbols with "-I" added, and the configuration, operations and effects will not be described to avoid repetition.

The sloped surface 34-I is formed on a surface of the arm 30-I close to the optical member 16, the surface facing the optical member 16. As illustrated in FIG. 22, the sloped surface 34-I is sloped from the middle portion of the arm 30-I in its extending direction (parallel arrangement direction of the cold cathode tubes 18) downwardly to the ends of the arm 30-I in the extending direction. The light emitted from the cold cathode tubes 18 effectively reflects off the sloped surface 34-I to be directed to the optical member 16.

Eleventh Embodiment

Figure 23:
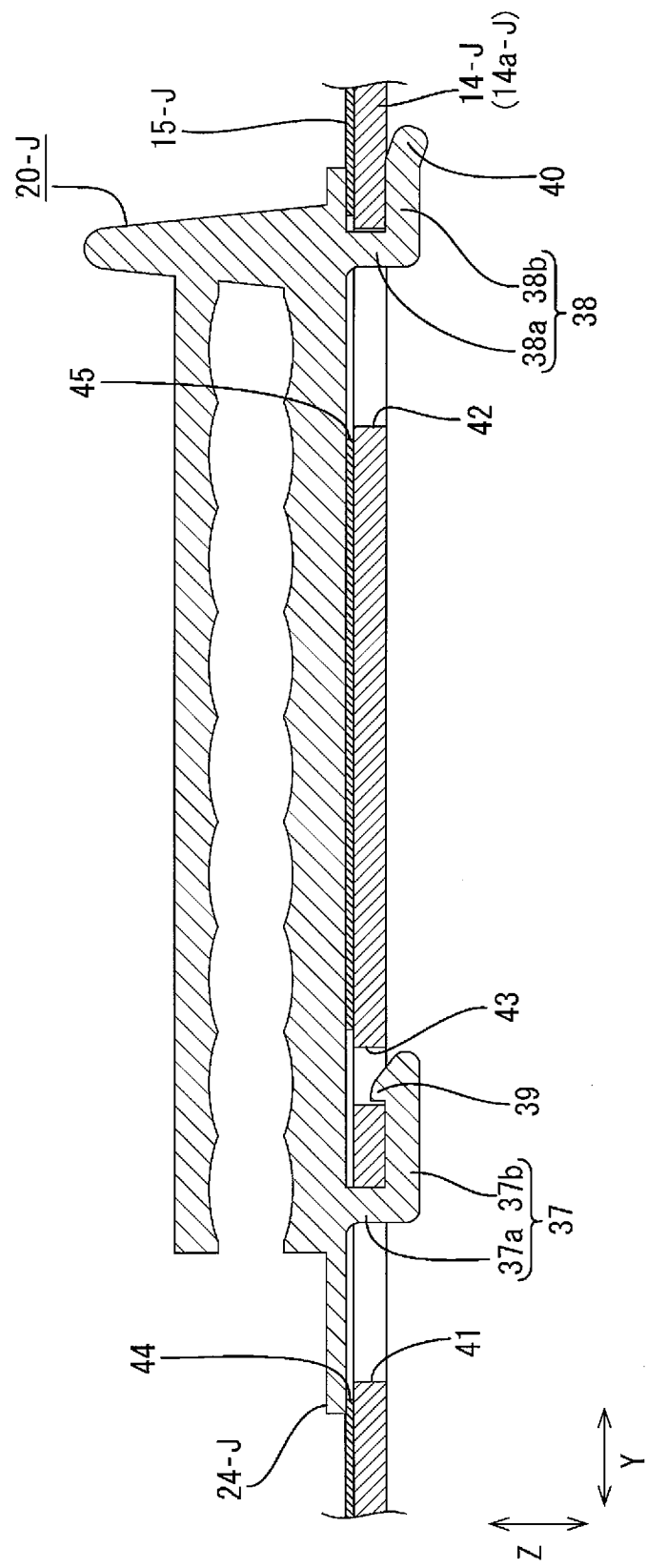
FIG. 23 is a cross-sectional view illustrating a lamp clip according to an eleventh embodiment of the present invention.

An eleventh embodiment of the present invention will be explained with reference to FIGS. 23 to 25. In the eleventh embodiment, the attachment configuration of lamp clips 20-J to a chassis 14-J is changed. In the eleventh embodiment, the parts that are changed from the first embodiment are indicated by the same symbols with "-J" added, and the configuration, operations and effects will not be described to avoid repetition.

In the attachment configuration of the lamp clips 20-J according to this embodiment, the lamp clip 20-J is slid along the chassis 14-J to be attached thereto. Specifically, a pair of attachment portions 37, 38 provided on the rear surface of the main body 24-J is formed in a hook along the rear surface (plate surface) of the main body 24-J as illustrated in FIG. 23. Among the attachment portions 37, 38, the left one in FIG. 23 is referred to as a first attachment portion 37 and the right one in FIG. 23 is referred to as a second attachment portion 38.

The configuration common to the attachment portions 37, 38 will be explained. Each of the first attachment portion 37 and the second attachment portion 38 has a basal portion 37a, 38a and an extended portion 37b, 38b respectively, and is formed in a substantially L-shape with a front view. Each of the basal portion 37a, 38a extends from a rear surface of the main body 24-J. Each of the first attachment portion 37 and the second attachment portion 38 is bent by substantially 90 degrees at a distal end of each basal portion 37a, 38a and each extended portion 37b, 38b extends therefrom along the long-side direction of the main body 24-J to form cantilevered-extended portions 37b, 38b. Each basal portion 37a, 38a is formed in a substantially quadrangular prism having a rectangular cross section and its long-side direction is aligned with the short-side direction of the main body 24-J. The extended portion 37b, 38b extends substantially in parallel with the plate surface of the main body 24-J and is elastically deformable to be separated from the main body 24-J (in the Z-axis direction) with its basal end connected to the basal portion 37a, 38a serving as a support point. The direction of the extended portion 37b, 38b extending from the basal portion 37a, 38a is aligned with the sliding direction of the lamp clip 20-J when the lamp clip 20-J is attached to the chassis 14-J. A width of each basal portion 37a, 38a is substantially same as that of each extended portion 37b, 38b in the short-side direction of the main body 24-J, and the width of each of the basal portions 37a, 38a and the extended portions 37b, 38b in the short-side direction of the main body 24-J is smaller than the length of the short side of the main body 24-J.

Differences in the configuration of the first attachment portion 37 and the second attachment portion 38 will be explained. The first attachment portion 37 has an engagement projection 39 projecting from the distal end of the extended portion 37b toward the main body 24-J. The engagement projection 39 has a tapered surface facing the main body 24-J. The engagement projection 39 has a surface facing the basal portion 37a that is substantially parallel to an outer surface of the basal portion 37a and is a substantially plane surface along a line crossing to the sliding direction of the lamp clip 20-J with respect to the chassis 14-J. The surface of the engagement projection 39 facing the basal portion 37a is an engagement surface that is engaged to the engagement opening 43 of the chassis 14-J. The second attachment portion 38 has a guide 40 at a distal end of the extended portion 38b. The guide 40 guides the lamp clip 20-J to be attached to the chassis 14-J. The guide 40 is formed to be sloped so as to be away from the main body 24-J as it goes closer to the distal end. The extended portion 38b of the second attachment portion 38 is formed so that the distal end of the extended portion 38b does not extend outwardly from the end of the min body 24-J in its long-side direction and is disposed behind the main body 24-J and is not visible from the front side with a planar view.

The configuration of the chassis 14-J to which the attachment portions 37, 38 are attached will be explained. A pair of attachment openings 41, 42 is formed in a bottom plate 14a-J of the chassis 14-J so as to correspond to the attachment portions 37, 38, respectively. An engagement opening 43 is formed in the bottom plate 14a-J so as to correspond to the engagement projection 39 of the first attachment portion 37. Among the attachment openings 41, 42, the one on the left side in FIG. 23 is referred to as a first attachment opening 41 and the another one on the right side in FIG. 23 is referred to as a second attachment opening 42.

Each of the first attachment opening 41 and the second attachment opening 42 is formed in a rectangle with a planar view so as to correspond to each of the first attachment portion 37 and the second attachment portion 38, respectively. The length of the first attachment opening 41 and the second attachment opening 42 in its long-side direction and the width of the first attachment opening 41 and the second attachment opening 42 in its short-side direction are smaller than the length and width of the main body 24-J, respectively. Therefore, in a state that the lamp clip 20-J is attached to the chassis 14-J, the first attachment hole 41 and the second attachment hole 42 are closed by the main body 24-J. The engagement opening 43 is formed between the attachment openings 41, 42 and close to the first attachment opening 41 in the bottom plate 14a-J of the chassis 14-J. The engagement projection 39 of the first attachment portion 37 enters the engagement opening 43 to be engaged to the edge of the engagement opening 43. Like the first attachment opening 41 and the second attachment opening 42, the engagement opening 43 has a length and a width smaller than the main body 24-J with a planar view and is closed by the main body 24-J in the state that the lamp clip 20-J is attached to the chassis 14-J. The reflective sheet 15-J has a pair of insertion openings 44, 45 so as to correspond to the attachment openings 41, 42, respectively. The first insertion opening 44 corresponding to the first attachment opening 41 is formed so that the first attachment opening 41 and the engagement opening 43 are collectively disposed therein. The second insertion opening 45 is formed to be larger than the second attachment opening 42.

An attachment operation of the lamp clip 20-J to the chassis 14-J will be explained.

Figure 24:
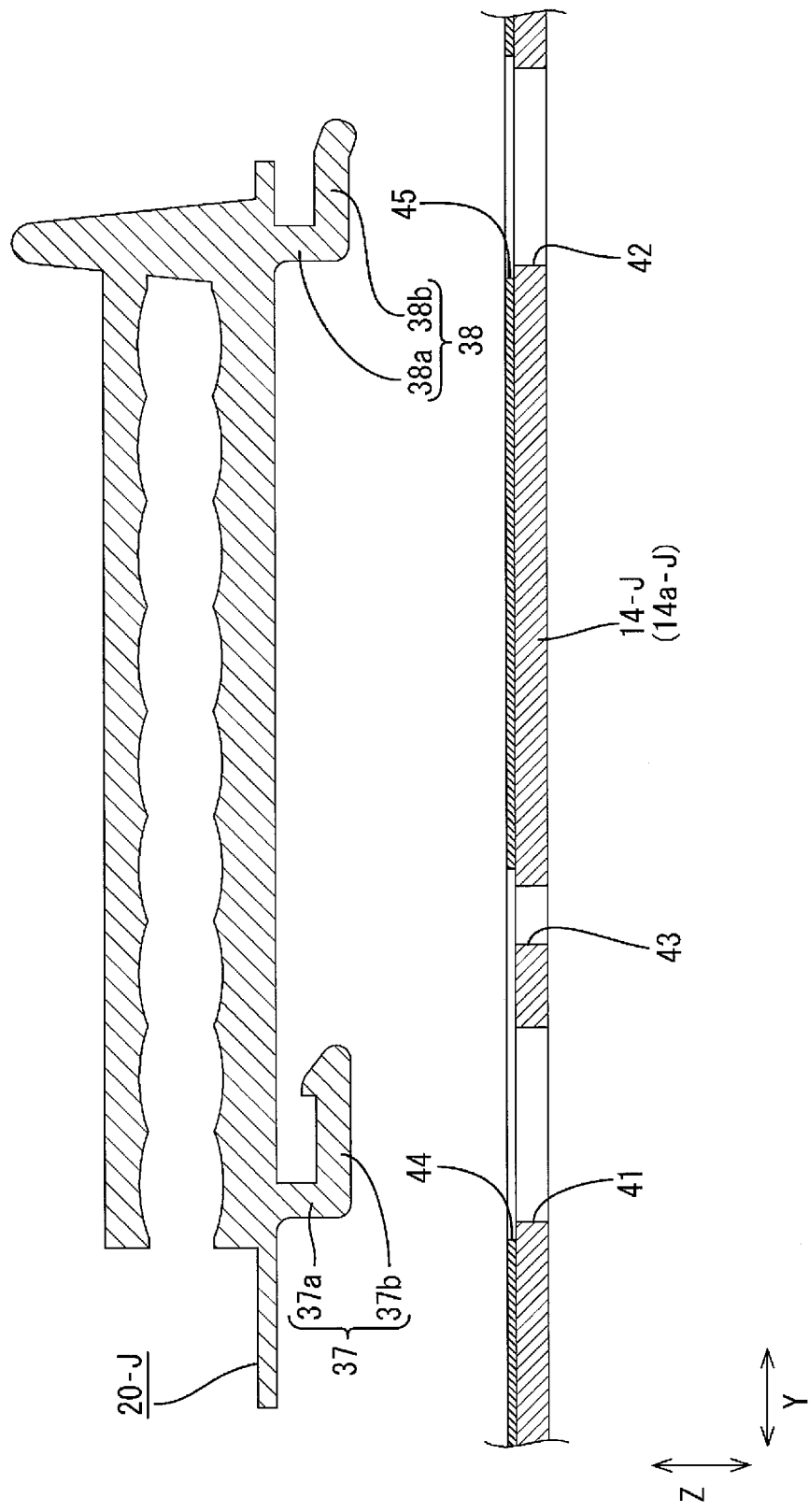
FIG. 24 is a cross-sectional view illustrating a cross-sectional view illustrating the lamp clip before being attached to the chassis.
Figure 25:
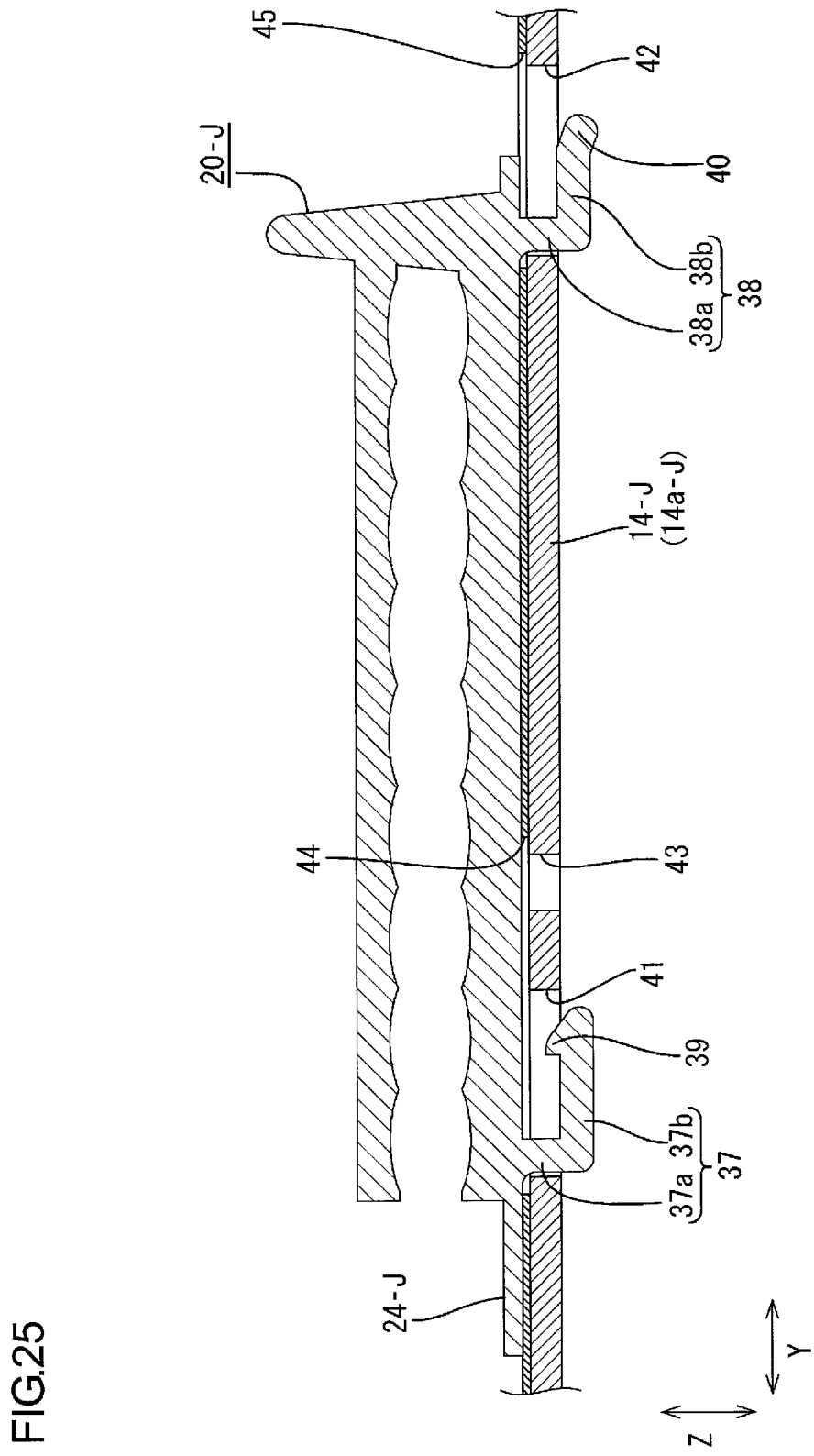
FIG. 25 is a cross-sectional view illustrating the lamp clip before being slid.

As illustrated in FIG. 24, a reflective sheet 15-J is disposed in the chassis 14-J so that the attachment opening 41 and the engagement opening 43 correspond to the insertion opening 44 and the attachment opening 42 corresponds to the insertion opening 45. Then, the attachment operation of the lamp clip 20-J to the bottom plate 14a-J of the chassis 14-J is started. Each attachment portion 37, 38 is positioned in the corresponding attachment opening 41, 42 and the lamp clip 20-J is pressed toward the bottom plate 14a-J of the chassis so that each attachment portion 37, 38 is inserted in the corresponding attachment opening 41, 42. If the rear surface of the main body 24-J abuts the reflective sheet 15-J, the extended portions 37b, 38b of the attachment portions 37, 38 protrude from the rear surface of the bottom plate 14a-J of the chassis 14-J.

From this state, the lamp clip 20-J is slid in the long-side direction of the main body 24-J along the parallel arrangement direction of the cold cathode tubes 18 (Y-axis direction). This makes the engagement projection 39 to go over the edge of the first attachment opening 41 to the rear surface of the bottom plate 14a-J. Accordingly, the extended portion 37b of the first attachment portion 37 is elastically deformed temporarily. In this process, the guide 40 formed at the distal end of the second attachment portion 38 is slid along the edge of the second attachment opening 42, and this achieves a smooth sliding movement. If the lamp clip 20-J is slid for a predetermined distance, the engagement projection 39 enters the engagement opening 43 and the extended portion 37b of the first attachment portion 37 restores to its original shape. In this state, the engagement surface of the engagement projection 39 is engaged to the edge of the engagement opening 43. This restricts the lamp clip 20-J from moving in a direction opposite to the sliding direction in the attachment of the lamp clip 20-J, that is, a removing direction. In the attached state, in the bottom plate 14a-J of the chassis 14-J, the end of each attachment opening 41, 42 is held by the extended portion 37b, 38b of the attachment portion 37, 38 and the main body 24-J so that the lamp clip 20-J is kept in the attached state.

Other Embodiments

The embodiments of the present invention have been described, however, the present invention is not limited to the above embodiments explained in the above description and the drawings. The following embodiments may be included in the technical scope of the present invention, for example.

(1) Unlike the above-described embodiments, the arrangement patterns of the cold cathode tubes may be changed in various forms. In such cases, it is selectively determined which one of sets of lamp receiving surfaces holds the cold cathode tube, and accordingly the lamp clip easily deals with the various forms of the arrangement patterns without changing the configuration of the lamp clip.

(2) Unlike the above-described embodiments, the size of the lamp receiving surface in the parallel arrangement direction of the cold cathode tubes may be changed arbitrarily. For example, the size of each lamp receiving surface may be same as the diameter of the cold cathode tube.

(3) Unlike the above-described embodiments, the interval between the lamp receiving surfaces may be changed arbitrarily. For example, the interval between the lamp receiving surfaces may be or greater than a minimum possible interval between the arranged cold cathode tubes.

(4) In the above-described embodiments, the cross section of the lamp receiving surface has an arc shape. However, the shape of the lamp receiving surface may be changed arbitrarily.

(5) In the third embodiment, the adjacent lamp receiving surfaces are connected via the flat surface. However, the adjacent lamp receiving surfaces connected via a surface other than the flat surface is also included in the present invention.

(6) In the above-described embodiments, the lamp receiving surfaces are formed by depressing the inner surface of the arm. The lamp receiving surfaces that are formed by projecting the inner surface of the arm is also included in the present invention.

(7) Unlike the above-described embodiments, the number of lamp receiving surfaces formed on the arm may be changed arbitrarily.

(8) In the above-described embodiments, the arm close to the chassis is connected to the main body over its entire surface. However, the arm close to the chassis partially connected to the main body is also included in the present invention. Specifically, only the basal portion of the arm close to the chassis is connected to the main body so that the arms are elastically deformable. In such a case, a sloped surface as formed on the arm facing the optical member may be provided on a surface of the arm close to the chassis facing the chassis (main body).

(9) In the above-described embodiments, the arms are directly or indirectly connected to the main body. However, the arms may be molded independently of the main body and may be integrally formed with each other by assembling.

(10) In the above-described embodiments, the arms do not protrude outwardly from an outer peripheral end of the main body. However, the arms may protrude outwardly from the outer peripheral end of the main body.

(11) In the above-described embodiments, the sloped surface is formed on the arm close to the optical member. However, the sloped surface may be omitted.

(12) In the above-described embodiments, the color of the surface of the lamp clip is white. However, it may be milky white for example. The entire lamp clip may be formed of a transparent resin material.

(13) Unlike the above-described embodiments, the number of cold cathode tubes held by the arms may be changed arbitrarily. For example, only one cold cathode tube may be held by the arms.

(14) In the above-described embodiments, the lamp clip has one support pin. However, the number of support pins or the position of the support pins may be changed arbitrarily. The lamp clip without having the support pin is also included in the present invention.

(15) In the above-described embodiments, a pair of attachment portions is provided on the lamp clip. However, the number of attachment portions or the position of the attachment portions may be changed arbitrarily. The lamp clip without having the attachment portions is also included in the present invention. In such a case, the lamp clip may be fixed to the chassis by another fixing means such as an adhesive agent.

(16) In the above-described embodiments, the lamp clip has the main body. However, the lamp clip may not have the main body.

(17) In the above-described embodiments, the cold cathode tube is used as the linear light source. However, other type of linear light source such as a hot cathode tube may be used as the linear light source.

(18) In the above-described embodiments, the chassis is formed of a metal plate. However, it may be formed of a resin by molding.

(19) In the above-described embodiments, the TFTs are used as the switching components of the liquid crystal display device. However, the switching components other than the TFTs (for example, thin film diode (TFD)) may be used as the switching components of the liquid crystal display device. Other than the liquid crystal display device displaying color images, the present invention may be applied to a liquid crystal display device displaying black and white images.

(20) The above-described embodiments describe the liquid crystal display device using a liquid crystal panel as the display panel. However, the present invention may be applied to a display device using other types of display panel.

(21) The above-described embodiments describe the TV receiver provided with a tuner. However, the present invention may be applied to a display device without having a tuner.

The invention claimed is:

1. A light source holder holding at least one of a plurality of linear light sources that are arranged parallel to each other, the light source holder comprising:
    a pair of arms configured so as to extend along a parallel arrangement direction of the light sources, the parallel arrangement direction extending from one linear light source to another, such that distal ends of the arms are separated from each other to form an opening that allows insertion and removal of the linear light source therethrough, the arms holding the linear light source therebetween; and
    a plurality of light source receivers provided so as to be along the parallel arrangement direction on at least one of surfaces of the arms, the surface to be opposite the linear light source, each of the light source receivers being configured to receive the linear light source; wherein
    the light source receivers are provided to hold a plurality of linear light sources between the arms and the number of light source receivers is greater than that of linear light sources to be attached to the light source holder.

2. The light source holder according to claim 1, wherein the adjacent light source receivers are continuously formed from each other.

3. The light source holder according to claim 1, wherein a size of each light source receiver in the parallel arrangement direction is smaller than a diameter of the linear light source.

4. A light source holder holding at least one of a plurality of linear light sources that are arranged parallel to each other, the light source holder comprising:
    a pair of arms configured so as to extend along a parallel arrangement direction of the light sources, the parallel arrangement direction extending from one linear light source to another, such that distal ends of the arms are separated from each other to form an opening that allows insertion and removal of the linear light source therethrough, the arms holding the linear light source therebetween; and a plurality of light source receivers provided so as to be along the parallel arrangement direction on at least one of surfaces of the arms, the surface to be opposite the linear light source, each of the light source receivers being configured to receive the linear light source; wherein an interval between the light source receivers is smaller than a minimum possible interval between the linear light sources.

5. The light source holder according to claim 1, wherein the light source receiver is formed by depressing a surface of the arm facing the linear light source.

6. The light source holder according to claim 1, wherein the light source receiver is formed in a substantially arc shape so as to be along an outer peripheral surface of the linear light source.

7. The light source holder according to claim 1, wherein the light source receivers are formed on the arms.

8. The light source holder according to claim 1, further comprising a support portion that supports an optical member to be arranged so as to face the linear light source, wherein the arms are continuously formed from the support portion.

9. The light source holder according to claim 1, wherein the arm has a convex surface opposite from a surface facing the linear light source.

10. The light source holder according to claim 1, further comprising a main body formed in a substantially plate so as to be aligned to an axial direction of the linear light source and the parallel arrangement direction, wherein the arms are formed within an area of the main body defined by sides to be aligned to the axial direction and the parallel arrangement direction.

11. The light source holder according to claim 1, further comprising a main body formed in a substantially plate so as to be aligned to an axial direction of the linear light source and the parallel arrangement direction, wherein one of the arms adjacent to the main body is continuously formed from the main body.

12. The light source holder according to claim 1, wherein the arms are formed integrally with each other.

13. A lighting device comprising:
at least one light source holder according to claim 1;
at least one linear light source held by the light source holder; and
a chassis housing the linear light source and to which the light source holder is attached.

14. The lighting device according to claim 13, wherein the at least one light source holder includes a plurality of light source holders attached to the chassis such that the opening of each light source holder opens toward a middle portion of the chassis.

15. A display device comprising:
the lighting device according to claim 13; and
a display panel configured to provide display using light from the lighting device.

16. The display device according to claim 15, wherein the display panel is a liquid crystal display panel including liquid crystal between a pair of substrates.

17. A television receiver comprising the display device according to claim 15.

* * * * *